(12) United States Patent
Li et al.

(10) Patent No.: US 12,486,176 B2
(45) Date of Patent: Dec. 2, 2025

(54) COMPOSITE PARTICLE AND METHOD OF PRODUCING COMPOSITE PARTICLE

(71) Applicant: DIC Corporation, Tokyo (JP)

(72) Inventors: Meng Li, Qingdao (CN); Shingo Takada, Sakura (JP); Tomoki Dohi, Sakura (JP); Jianjun Yuan, Sakura (JP); Cheng Liu, Qingdao (CN); Wei Zhao, Qingdao (CN); Shaowei Yang, Qingdao (CN)

(73) Assignee: DIC Corporation, Tokyo (JP)

( * ) Notice: Subject to any disclaimer, the term of this patent is extended or adjusted under 35 U.S.C. 154(b) by 706 days.

(21) Appl. No.: 17/766,306

(22) PCT Filed: Oct. 9, 2019

(86) PCT No.: PCT/CN2019/110128
§ 371 (c)(1),
(2) Date: Apr. 4, 2022

(87) PCT Pub. No.: WO2021/068126
PCT Pub. Date: Apr. 15, 2021

(65) Prior Publication Data
US 2023/0131773 A1     Apr. 27, 2023

(51) Int. Cl.
*C01F 7/30* (2022.01)
*B32B 5/16* (2006.01)
*C01F 7/442* (2022.01)

(52) U.S. Cl.
CPC ............. *C01F 7/442* (2013.01); *B32B 5/16* (2013.01); *C01F 7/30* (2013.01); *C01P 2002/70* (2013.01); *C01P 2004/03* (2013.01); *C01P 2004/20* (2013.01); *C01P 2004/45* (2013.01); *C01P 2004/54* (2013.01); *C01P 2004/61* (2013.01); *C01P 2004/84* (2013.01); *C01P 2006/21* (2013.01)

(58) Field of Classification Search
None
See application file for complete search history.

(56) References Cited

U.S. PATENT DOCUMENTS

| | | |
|---|---|---|
| 6,620,508 B2 | 9/2003 | Inoue et al. |
| 10,343,928 B2 | 7/2019 | Watanabe et al. |

(Continued)

FOREIGN PATENT DOCUMENTS

| | | |
|---|---|---|
| CN | 104130598 A | 11/2014 |
| CN | 107074573 A | 8/2017 |

(Continued)

OTHER PUBLICATIONS

English translation of JP 2014-28716 (originally published Feb. 13, 2014), obtained from PE2E search.*

(Continued)

*Primary Examiner* — George Wyszomierski
(74) *Attorney, Agent, or Firm* — Troutman Pepper Locke LLP; James E. Armstrong, IV; Nicholas J. DiCeglie, Jr.

(57) ABSTRACT

The composite particle of the present invention includes an alumina particle having a card-house structure which is formed of three or more pieces of plate-like alumina and in which the pieces of plate-like alumina are fixed to each other; and an inorganic coating part provided on a surface of the plate-like alumina.

6 Claims, 4 Drawing Sheets

(56) References Cited

U.S. PATENT DOCUMENTS

| | | | |
|---|---|---|---|
| 11,401,169 B2* | 8/2022 | Takada | C01B 33/26 |
| 2003/0022081 A1 | 1/2003 | Inoue et al. | |
| 2010/0151201 A1* | 6/2010 | Erickson | C09K 3/1418 |
| | | | 51/296 |
| 2013/0183527 A1 | 7/2013 | Bastida Cuairan et al. | |
| 2014/0322536 A1 | 10/2014 | Suzuki et al. | |
| 2017/0166454 A1 | 6/2017 | Watanabe et al. | |
| 2021/0053836 A1* | 2/2021 | Takada | C01F 7/442 |
| 2024/0059899 A1* | 2/2024 | Li | C01F 7/441 |

FOREIGN PATENT DOCUMENTS

| | | |
|---|---|---|
| CN | 110182834 A | 8/2019 |
| CN | 111902363 A | 11/2020 |
| EP | 2799398 B1 | 5/2018 |
| JP | S59-203774 A | 11/1984 |
| JP | H07-207066 A | 8/1995 |
| JP | 2005-306635 A | 11/2005 |
| JP | 4255233 B2 | 4/2009 |
| JP | 2014-28716 A | 2/2014 |
| JP | 2016-222501 A | 12/2016 |
| WO | 2016/084723 A1 | 6/2016 |

OTHER PUBLICATIONS

Sawao Honda et al., "Fabrication and thermal conductivity of highly porous alumina body from platelets with yeast fungi as a pore froming agent", Ceramics International, vol. 42, No. 12, Sep. 1, 2016, pp. 13882-13887. (cited in the Jun. 14, 2023 EP OA).

S. Hashimoto et al., "Synthesis and mechanical properties of porous alumina from anisotropic alumina particles", Journal of the European Ceramic Society, Elsevier, Amsterdam, NL, vol. 30, No. 3, Feb. 1, 2010 , pp. 635-639. (cited in the Jun. 14, 2023 EP OA).

Office Action mailed Feb. 25, 2023, issued for CN201980101209.8.

* cited by examiner

[Fig1]
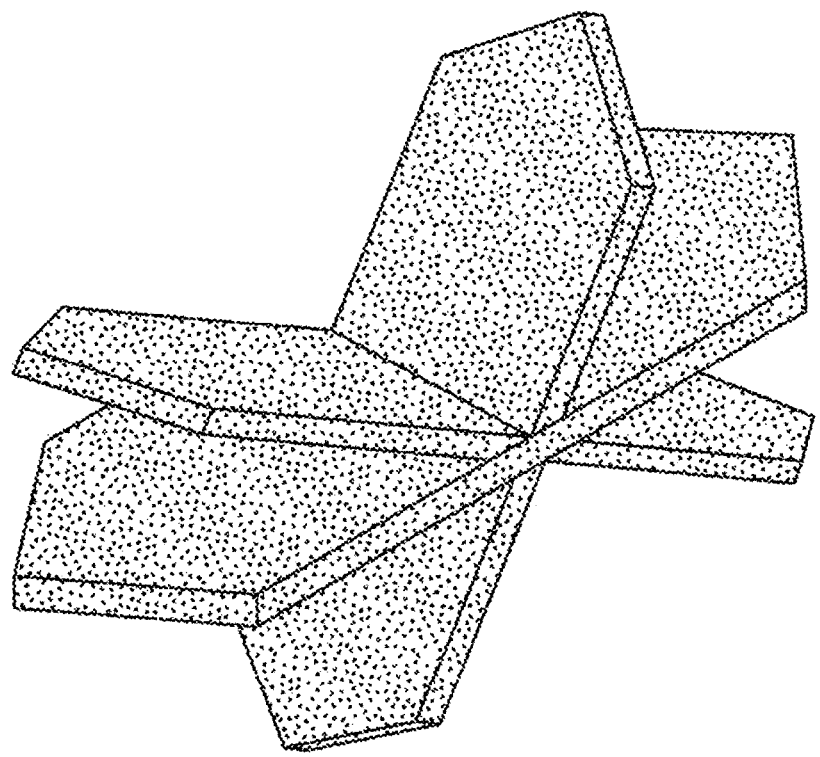

[Fig2]
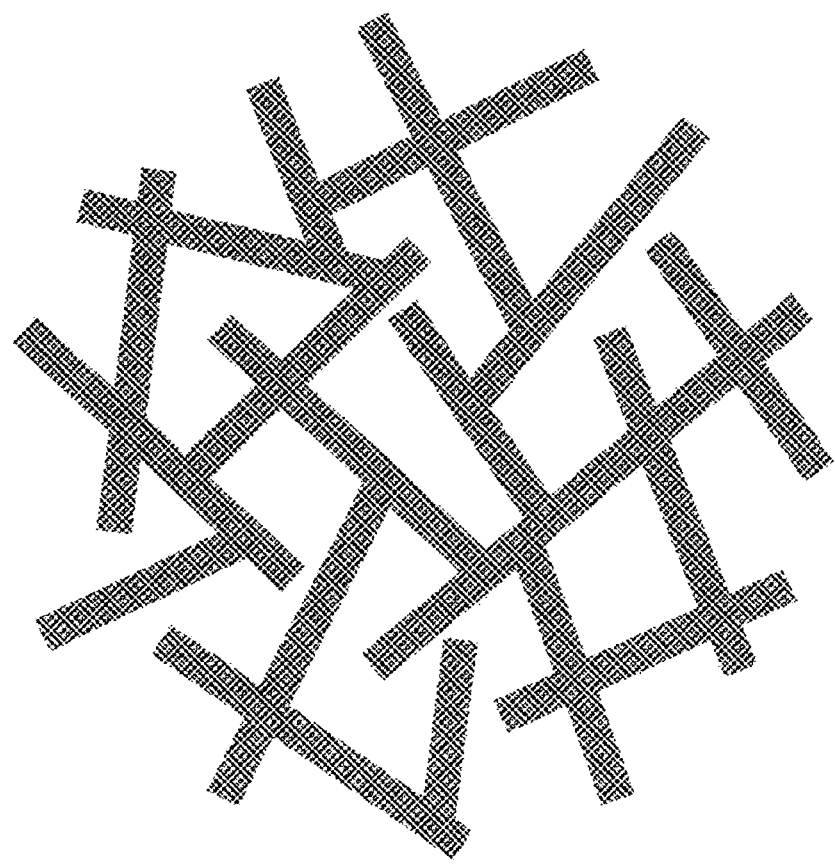

[Fig3]
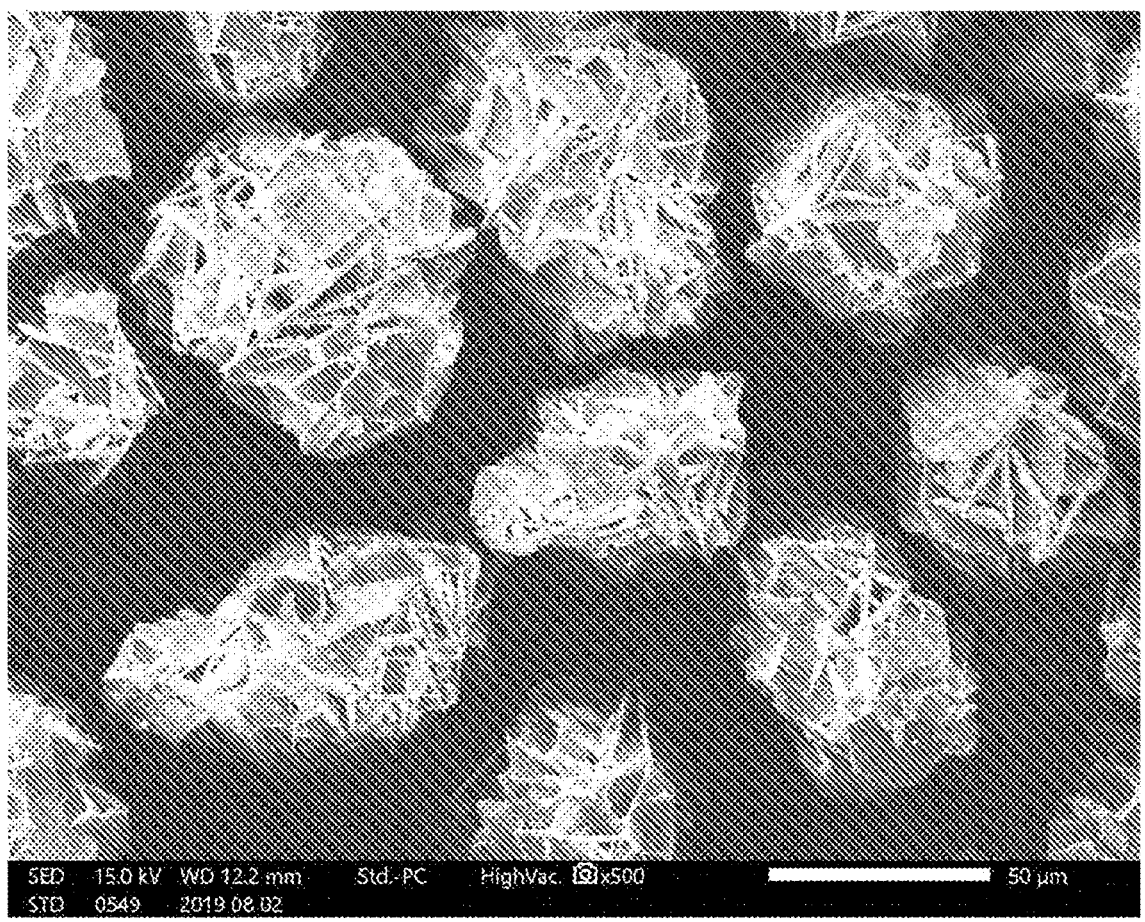

[Fig4]
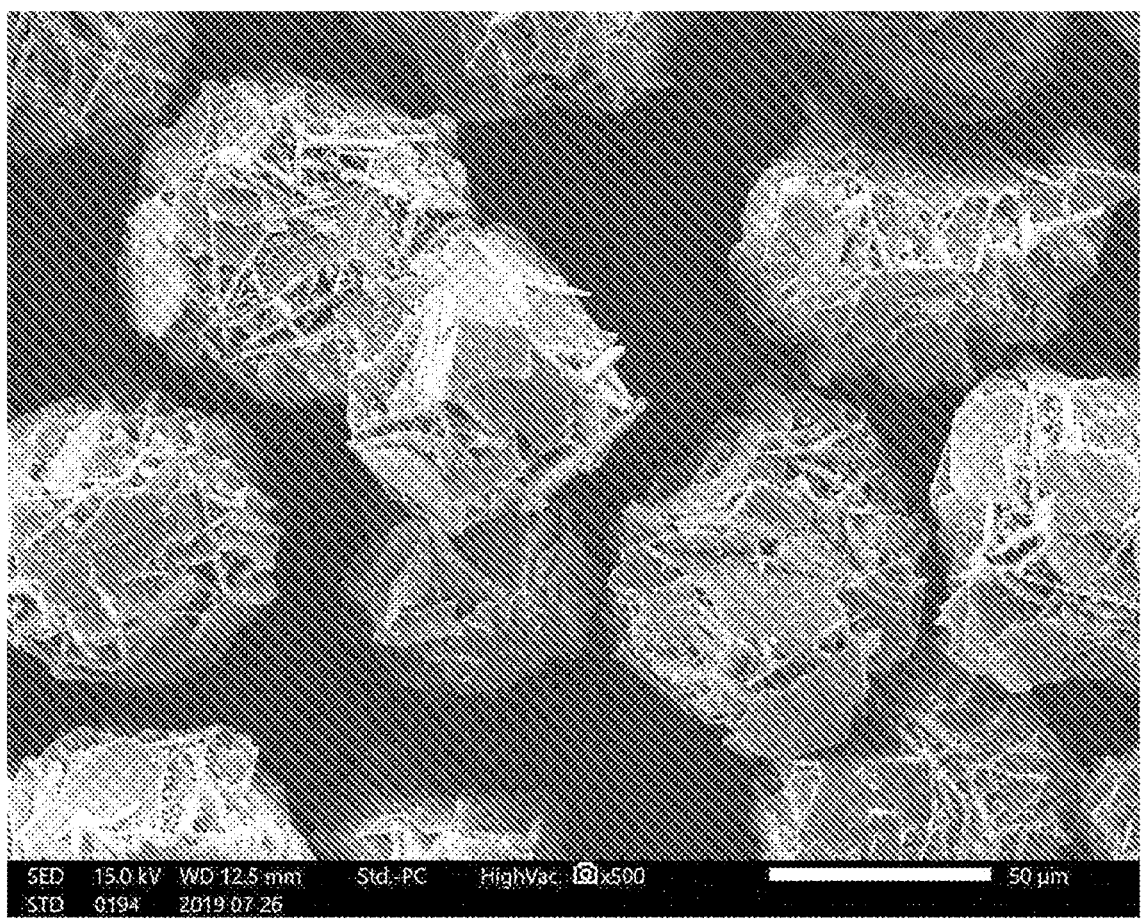

COMPOSITE PARTICLE AND METHOD OF PRODUCING COMPOSITE PARTICLE

TECHNICAL FIELD

The present invention relates to a composite particle and a method of producing the composite particle, and particularly, to a composite particle in which a coating part is provided on a card-house type alumina particle.

BACKGROUND ART

In the related art, regarding inorganic fillers, various types such as, for example, boron nitride, and alumina, are known. These are used according to desired applications, and there are higher expectations for alumina than for boron nitride and the like because it has excellent technical advantages such as excellent hardness, excellent mechanical strength, and a high maximum operation temperature in an oxidizing atmosphere and is also cheaper.

It is known that alumina particles have various structures such as a granular form, a needle shape, and a plate-like shape depending on the production method. Generally, plate-like alumina particles have problems in practical use because, when the aspect ratio is higher, the surface area increases and the bulk density increases, which results in decrease in the fluidity of a powder.

Patent Document 1 discloses twin alumina particles having a particle size of 0.5 to 10 μm in which two pieces of plate-like alumina which are pieces of alumina having unique shapes of a penetrating type are grown such that they intersect each other.

Patent Document 2 discloses particles in which a plate-like crystalline alumina composite oxide fine particle aggregate in which whisker-like alumina composite oxide fine particles such as boehmite aggregate in a plate-like shape has a card-house structure. The whisker-like alumina composite oxide fine particles are a plate-like crystalline alumina composite oxide fine particle aggregate having an average length of 2 to 100 nm, and an average diameter range of 1 to 20 nm, and an average particle size of composite oxide fine particle aggregates of 30 to 300 nm and an average thickness range of 2 to 50 nm. That is, the particles themselves in which fine particle aggregates have a card-house structure are fine alumina composite oxide particles that do not reach the micron order.

In addition, regarding coated alumina particles, Patent Document 3 discloses alumina particles of which the surface is uniformly coated with zirconia nanoparticles. The zirconia nanoparticles have an average particle size of 100 nm or less, and alumina particles have an average particle size of 0.1 m or more.

CITATION LIST

Patent Literature

[Patent Document 1]
 Japanese Unexamined Patent Application, First Publication No. H7-207066
[Patent Document 2]
 Japanese Unexamined Patent Application, First Publication No. 2014-28716
[Patent Document 3]
 Japanese Unexamined Patent Application, First Publication No. 2005-306635

SUMMARY OF INVENTION

Technical Problem

Patent Document 1 describes that it is possible to provide a polymer compound which imparts wear resistance to a plastic and rubber, improves its strength and flame retardance, and additionally increases a coefficient of friction on the surface, and has excellent transparency. However, there is no disclosure regarding such twin alumina particles exhibiting excellent fluidity as a powder.

In addition, in Patent Document 2, there is no disclosure regarding particles in which such composite oxide fine particle aggregates have a card-house structure having excellent fluidity as a powder. In addition, for example, when the particles are added as a filler to a binder or a solvent, not only is there a concern of processability deteriorating due to an extreme increase in viscosity of a slurry, but formation of an efficient conduction path with respect to a larger interface is also disadvantageous, and there is a risk of functions derived from alumina having excellent thermal conductivity being impaired.

In addition, Patent Document 3 describes that a dense alumina sintered substance having few pores, excellent toughness, and high flexural strength is obtained, but there is no description of alumina particles having a card-house structure, and there is nothing about the fluidity of a powder.

The present invention has been made in view of the above circumstances, and an object of the present invention is to provide composite particles having excellent fluidity and a method of producing the composite particles.

Solution to Problem

The inventors conducted extensive studies in order to address the above problems, and as a result, found that composite particles in which alumina particles having a card-house structure are coated with an inorganic coating part have excellent fluidity, and thereby the present invention was completed. That is, the present invention provides the following aspects in order to solve the above problems.

[1] A composite particle including:
  an alumina particle having a card-house structure which is formed of three or more pieces of plate-like alumina and in which the pieces of plate-like alumina are fixed to each other; and
  an inorganic coating part provided on a surface of the pieces of plate-like alumina.
[2] The composite particle according to [1],
  wherein the average particle size of the alumina particle is 3 m or more and 1,000 μm or less.
[3] The composite particle according to [1],
  wherein the inorganic coating part is made of an oxide.
[4] The composite particle according to [3],
  wherein the oxide include one or more selected from the group consisting of titanium oxide, iron oxide, and silica.
[5] The composite particle according to [1],
  wherein the inorganic coating part is made of a metal.
[6] The composite particle according to [5],
  wherein the metal include one or more selected from the group consisting of silver, nickel, copper, gold, and platinum.
[7] The composite particle according to [1],
  wherein the alumina particle further comprise at least one of silicon and germanium.

[8] The composite particle according to [7],
wherein the alumina particle comprise mullite in a surface layer.

[9] The composite particle according to [1], wherein a powder of the composite particle has an angle of repose of 500 or less.

[10] A method of producing a composite particle, including:
firing a mixture including an aluminum compound containing aluminum, a molybdenum compound containing molybdenum, and a shape-controlling agent for controlling the shape of alumina particle and producing alumina particle having a card-house structure in which three or more pieces of plate-like alumina are fixed to each other; and
a step of forming an inorganic coating part on the surface of the pieces of plate-like alumina.

[11] The method of producing a composite particle according to [10],
wherein the shape-controlling agent includes one or more selected from the group consisting of silicon, a silicon compound containing silicon and a germanium compound containing germanium.

[12] The method of producing a composite particle according to [10],
wherein the mixture includes 10 mass % or less of a molybdenum compound containing molybdenum in terms of $MoO_3$ when a total amount of raw materials in terms of oxide is set as 100 mass %.

[13] The method of producing a composite particle according to [10],
wherein the mixture includes an aluminum compound having an average particle size of 2 m or more.

[14] The method of producing a composite particle according to any one of [10] to [13],
wherein the mixture further includes a potassium compound containing potassium.

[15] The method of producing a composite particle according to [10],
wherein the inorganic coating part is made of an oxide.

[16] The method of producing a composite particle according to [15],
wherein the oxide includes one or more selected from the group consisting of titanium oxide, iron oxide and silica.

[17] The method of producing a composite particle according to [10],
wherein the inorganic coating part is made of a metal.

[18] The method of producing a composite particle according to [17],
wherein the metal includes one or more selected from the group consisting of silver, nickel, copper, gold, and platinum.

Advantageous Effects of Invention

According to the present invention, it is possible to provide composite particles having excellent fluidity.

BRIEF DESCRIPTION OF DRAWINGS

FIG. 1 is a schematic view showing an example of a configuration of composite particles according to an embodiment of the present invention.

FIG. 2 is a schematic view showing another example of a configuration of composite particles according to the present embodiment.

FIG. 3 is an electron microscope image showing card-house type alumina particles as a substrate produced in Example 1.

FIG. 4 is an electron microscope image showing composite particles obtained in Example 1.

DESCRIPTION OF EMBODIMENTS

Embodiments of the present invention will be described below in detail with reference to the drawings.
<Composite Particles>
As shown in FIG. 1, composite particles according to the present embodiment include alumina particles having a card-house structure which is formed of three or more pieces of plate-like alumina, and in which the pieces of plate-like alumina are fixed to each other and an inorganic coating layer provided on the surface of the plate-like alumina.
<Alumina Particles Having a Card-House Structure>
In the alumina particles having a card-house structure, the particles have a card-house structure which is formed of three or more pieces of plate-like alumina and in which the pieces of plate-like alumina are fixed to each other. Hereinafter, alumina particles having a card-house structure will be simply abbreviated as alumina particles. The plate-like shape is, for example, a three-dimensionally hexahedral plate shape, and examples thereof include a 2D projection plane shape being a typical rectangular shape with four corners (rectangular plate shape) and a 2D projection plane shape being a polygonal shape having five or more corners (hereinafter the latter may be referred to as a polygonal plate shape). The alumina particles according to the embodiment may contain potassium. The alumina particles according to the embodiment may contain mullite and/or a germanium compound.

The form of alumina particles can be confirmed under a scanning electron microscope (SEM). The card-house structure refers to, for example, a structure in which plate-like particles are arranged in a complicated manner without being oriented. "Card-house structure" in this specification refers to a structure which is formed of three or more pieces of plate-like alumina and in which the pieces of plate-like alumina are fixed to each other, and for example, a structure in which three or more pieces of plate-like alumina adhere at two or more locations in an intersecting manner and planar directions of the pieces of plate-like alumina intersecting each other may be randomly arranged (refer to FIG. 2). The intersecting position may be any position on a plate-like alumina. The randomly arranged state means that the orientation in which surfaces intersect each other is not limited in any of X axis, Y axis, and Z axis orientations, and an angle at which surfaces intersect each other may be any angle. Details of "plate-like alumina" will be described below in detail.

A number of pieces of plate-like alumina contained in one alumina particle differs depending on the average particle size of alumina particles required. When used as a filler (filling agent), it is preferable that the number of pieces of plate-like alumina contained in one alumina particle is, for example, 3 to 10,000, especially 10 to 5,000, and particularly 15 to 3,000, in terms of ease of production and performance.

The intersecting of plate-like alumina is exhibited when three or more pieces of plate-like alumina are fixed and adhere due to certain interactions, for example, in the process of forming a crystal in the firing step. As a result, these may be viewed as being of a penetration type. The strength of the card-house structure increases when pieces of plate-like alumina are firmly fixed to each other.

In addition, intersecting means that two or more surfaces intersect at one location, and there is no limitation to the position, diameter, area, and the like where surfaces intersect each other. In addition, the number of orientations of surfaces from an intersecting location used as a starting point may be three, four and more.

Here, the major diameter, minor diameter, and thickness of the plane of the plate-like alumina itself contained in the card-house structure may be any size. In addition, pieces of plate-like alumina with a plurality of sizes may be contained.

As described above, the plate-like alumina may be a rectangular plate-like alumina or a polygonal plate-like alumina. In a single alumina particle, one or both of rectangular plate-like alumina and polygonal plate-like alumina may be present and the ratio therebetween is not limited.

In addition, as long as the fluidity improving effect is not impaired, in addition to a card-house structure, examples of the structures of the alumina particles include substantially X-shaped particles in which two pieces of plate-like alumina intersect each other (sometimes referred to as twin alumina particles; refer to FIG. 1), substantially T-shaped particles, substantially L-shaped particles, and single plated alumina. Of course, in order to obtain excellent fluidity, low contents thereof are preferably used, and the amount of alumina particles having a card-house structure formed of three or more pieces of plate-like alumina and in which the pieces of plate-like alumina are fixed to each other is preferably 80% or more based on the weight or the number thereof. The content is more preferably 90% or more and most preferably 95% or more. The amount of twins or a single plate-like alumina can be easily adjusted by a general classification operation such as sieve classification and air classification.

Alumina particles having a card-house structure have a very high crushing strength due to their unique structure and are not easily crushed even if external stress is applied. Therefore, poor fluidity is unlikely to occur due to anisotropy of the alumina particles themselves when added as a binder or a solvent. Accordingly, functions inherent to alumina particles can be sufficiently exhibited and even if they are mixed and used in combination with plate-like alumina particles, it is possible for plate-like alumina particles that tend to be oriented in the longitudinal direction to be arranged in random directions. As a result, properties inherent to alumina such as heat conduction and mechanical strength can be exhibited not only in the longitudinal direction but also in the thickness direction.

Alumina particles have an excellent fluidity as a powder due to their unique structure, and when used in applications in industrial products, it is possible to increase a rate of discharge from supply machines such as hoppers and feeders during mechanical transport. Alumina particles have voids therein due to their unique structure and have a bulk specific gravity that is not much different from that of plate-like alumina particles, but they have a higher sphericity than plate-like alumina particles, and they are unlikely to break due to high crushing strength as described above, and thus an effect on ease of transport due to rolling between alumina particles is assumed to be strong.

Alumina particles have a card-house structure. The card-house structure is the same as described above. In the alumina particles, preferably, plate-like alumina has a polygonal shape with four or more faces, and at least some of adjacent alumina particles are in contact with each other, and more preferably plate-like alumina has a polygonal plate shape with five or more faces, and at least some of adjacent alumina particles are in contact with each other.

[Crystal Form and a Crystallization Rate]

The alumina particles are aluminum oxide, and the crystal form is not particularly limited, for example, transition alumina of various crystal forms such a $\gamma$, $\delta$, $\theta$, and $\kappa$ may be used, or transition alumina into which alumina hydrate is incorporated may be used. Basically an $\alpha$ crystal form is preferable from the viewpoint of superior mechanical strength and thermal conductivity.

The a crystallization rate of the alumina particles can be determined through XRD measurement.

For example, the produced sample is set on a measurement sample holder, and measurement is performed under conditions of Cu/K$\alpha$ rays, 40 kV/30 mA, a scan speed of 1.0°/min, and a scan range of 5 to 800 using a wide angle X-ray diffraction (XRD) device to be described below (Ultima IV, commercially available from Rigaku Corporation), and an $\alpha$ crystallization rate is determined from the intensity ratio of the peak of $\alpha$-alumina with respect to the base line. The a crystallization rate varies depending on firing conditions and raw materials used, and in order to improve the crushing strength and fluidity of the alumina particles, the a crystallization rate is preferably 90% or more and more preferably 95% or more. Here, the sample used for measurement may be the alumina particles having a card-house structure, or plate-like alumina particles obtained by disassembling the alumina particles having a card-house structure according to certain mechanical processing.

[Average Particle Size]

The average particle size of alumina particles having a card-house structure may be any size within a range in which this structure can be formed, and in order to obtain particularly excellent fluidity, the average particle size is preferably 3 μm or more and more preferably 10 μm or more. In addition, if the size is too large, appearance defects may be caused due to exposure of the card-house structure in various applications such as a thermally conductive filler and a high brilliance pigment. Thus, the average particle size is preferably 1,000 μm or less, more preferably 300 μm or less, and most preferably 100 μm or less.

The numerical range of the above values of average particle size of alumina particles may be, as an example, 3 μm or more and 300 μm or less, or 10 μm or more and 100 μm or less.

Here, in this specification, "average particle size of alumina particles" is a value calculated as a volume-based median size $D_{50}$ from a volume-based cumulative particle size distribution measured using a laser diffraction type dry particle size distribution analyzer.

[Maximum Particle Size]

In addition, a volume-based maximum particle size of alumina particles (in this specification, hereinafter simply referred to as a "maximum particle size" in some cases) is not particularly limited, and is generally 3,000 μm or less, preferably 1,000 μm or less, and more preferably 500 μm or less.

If the maximum particle size of the alumina particles is larger than the upper limit, this is not preferable because, when the particles are used by being added to a solvent or a binder as a matrix, depending on the form of final applications, there is a risk of alumina particles protruding from the surface of the binder layer, and the occurrence of appearance defects.

In addition, the average particle size of alumina particles and maximum particle size mentioned here are values obtained by a dry method in which alumina particles having a card-house structure which is formed of three or more pieces of plate-like alumina and in which the pieces of plate-like alumina are fixed to each other are analyzed using a laser diffraction type particle size distribution analyzer.

In addition, the average particle size and the maximum particle size can be estimated by, for example, a wet method in which particles are dispersed in an appropriate solvent, specifically, a sample in which alumina particles are dispersed in a pure water medium containing sodium hexametaphosphate and the like as a dispersion stabilizer and are analyzed using a laser diffraction/scattering type particle size distribution measuring device.

[Aspect Ratio of Plate-Like Alumina]

The plate-like alumina has a polygonal plate shape, and the aspect ratio, which is a ratio of the particle size to the thickness, is preferably 2 to 500. When the aspect ratio is 2 or more, this is preferable since it is advantageous for forming a card-house structure while a performance unique to the plate-like alumina is maintained. When the aspect ratio is 500 or less, this is preferable since it is easy to adjust the average particle size of alumina particles, and the occurrence of appearance defects and decrease in mechanical strength due to exposure of the card-house structure in various applications such as a thermally conductive filler and a high brilliance pigment can be minimized. The aspect ratio is more preferably 5 to 300, most preferably 7 to 100, and particularly preferably 7 to 50. When the aspect ratio is 7 to 100 in consideration of practicality, this is preferable since alumina particles having a card-house structure having the excellent thermal characteristics of plate-like alumina, optical characteristics such as brilliance and excellent fluidity can be obtained.

Here, in this specification, regarding the thickness of the plate-like alumina, an average value obtained by measuring thicknesses of at least 10 plate-like alumina particles was determined using a scanning electron microscope (SEM).

In addition, the average particle size of the plate-like alumina refers to an arithmetic average value of maximum lengths among distances between two points on the outlines of the plate, and the value is a value obtained by measurement using a scanning electron microscope (SEM).

The value of the average particle size of the plate-like alumina refers to a value obtained by measuring and calculating particle sizes of 100 arbitrary plate-like alumina from an image obtained using a scanning electron microscope (SEM).

Here, regarding a method of determining the average particle size of the plate-like alumina, for example, a method in which alumina particles are observed under an SEM and the maximum length of the plate-like alumina positioned at the center of the alumina particles is measured may be used. Alternatively, a method in which the maximum length of individual pieces obtained by performing an air classification operation on the alumina particles is measured under an SEM may be used. In addition, a method in which, under conditions in which the plate-like alumina itself does not break, individual pieces obtained by certain mechanical processing to the alumina particles having a card-house structure are obtained, and the maximum length of the obtained individual pieces is measured under an SEM may be used.

In addition, for example, since alumina particles having a card-house structure preferably have an average particle size of 3 m or more and 1,000 μm or less, plate-like alumina constituting them has, for example, a thickness of 0.01 m to 5 m, and an average particle size of 0.1 m to 500 m, and the aspect ratio, which is the ratio of the particle size to the thickness, is preferably 2 to 500. Particularly, when the alumina particles are used as filling agent, since it is easy to use them, the thickness of the plate-like alumina is 0.03 m to 3 m, the average particle size is 0.5 m to 100 m, and the aspect ratio, which is a ratio of the particle size to the thickness, is more preferably 5 to 300. The aspect ratio is most preferably 7 to 200.

[Silicon and Germanium]

In addition, it is preferable that alumina particles having a card-house structure contain silicon (silicon atoms and/or inorganic silicon compounds) and/or germanium (germanium atoms and/or inorganic germanium compounds). In particular, it is preferable that silicon and/or germanium be contained in the surface of the plate-like alumina. In particular, silicon and/or germanium is preferably contained locally on the surface because, for example, an affinity with a binder is effectively improved with a smaller amount thereof as compared with when it is incorporated thereinto.

In the method of producing alumina particles to be described below, the silicon and germanium may be derived from silicon, a silicon compound, and a germanium compound used as a shape-controlling agent.

Silicon contained in the alumina particles may be a silicon simple substance or silicon in a silicon compound. The alumina particles may contain at least one selected from a group consisting of mullite, Si, $SiO_2$, SiO, and aluminum silicate produced by reacting with alumina as the silicon or silicon compound, and the above-described substance may be included in the surface layer. Mullite will be described below.

The amount of the silicon and/or germanium unevenly distributed on the surface of the plate-like alumina containing silicon and/or germanium can be measured through, for example, analysis using an X-ray fluorescence analyzing device (XRF) and analysis using an X-ray photoelectron spectroscopic (XPS) method.

Generally, the X-ray fluorescence analysis method (XRF) is a method in which X-ray fluorescence generated when X-rays are emitted is detected, a wavelength and an intensity are measured, and thus quantitative analysis of a bulk composition of materials is performed. In addition, generally, the X-ray photoelectron spectroscopic method (XPS) is a method in which X-rays are emitted to the surface of a sample, a kinetic energy of photoelectrons released from the surface of the sample is measured, and thus analysis of the elemental composition constituting the surface of the sample is performed. Specifically, it is thought that the presence of silicon and/or germanium on the surface of the plate-like alumina and in the vicinity thereof can be estimated according to whether a value of [Si]/[Al]% (surface) or [Ge]/[Al]% (surface) obtained from XPS analysis results is higher than a value of [Si]/[Al]% (bulk, molar ratio) or [Ge]/[Al]% (bulk, molar ratio) obtained from XRF analysis results of a product. This is because an amount of silicon and/or germanium on the surface of the plate-like alumina obtained by adding silicon and/or germanium is larger than that in the innermost part of the plate-like alumina. Here, the XRF analysis described above can be performed using a Primus IV (commercially available from Rigaku Corporation) or the like. In addition, XPS analysis can be performed using a Quantera SXM (commercially available from ULVAC-PHI, Inc.) or the like.

Regarding alumina particles, preferably, silicon atoms and/or inorganic silicon compounds are locally contained in the surface of the plate-like alumina constituting the particles. In XPS analysis, the value of the molar ratio [Si]/[Al]

of Si to Al is preferably 0.001 or more, more preferably 0.01 or more, and most preferably 0.02 or more, and particularly preferably 0.1 or more.

The upper limit of the value of the molar ratio [Si]/[Al] in the XPS analysis is not particularly limited, and may be 0.5 or less, 0.4 or less, or 0.3 or less.

Regarding alumina particles, the value of the molar ratio [Si]/[Al] of Si to Al acquired in XPS analysis is preferably 0.001 or more and 0.5 or less, more preferably 0.01 or more and 0.4 or less, most preferably 0.02 or more and 0.3 or less, and particularly preferably 0.1 or more and 0.3 or less. When the molar ratio of Si to Al acquired in XPS analysis is within the above range, this is preferable since alumina particles having a card-house structure formed of plate-like alumina can be easily acquired, and the obtained alumina particles can exhibit excellent fluidity and crushing strength. In addition, for example, an affinity with a binder can be more favorable.

When the amount of silicon atoms and/or inorganic silicon compounds on the surface of the plate-like alumina is large, the surface of alumina particles composed of the plate-like alumina can have a property of being more hydrophobic compared to when there are no silicon atoms and/or inorganic silicon compounds, and it is possible to improve an affinity with organic compounds, and various binders and matrices when used as a filler. In addition, since silicon atoms and/or silicon compounds present on the surface of the alumina particles serve as reaction points and contribute to reactions with various coupling agents including organosilane compounds, the surface state of the surface of the alumina can be easily adjusted.

XPS analysis is performed under the same conditions as the measurement conditions described in examples to be described below or under compatible conditions in which the same measurement results are obtained.

When determination of an amount of Si on the surface of the alumina particles is performed using the above X-ray photoelectron spectroscopic (XPS) device, for example, an inorganic coating part of composite particles is dissolved in concentrated sulfuric acid in the case of titanium oxide, and dissolved in sulfuric acid in the case of iron oxide, and card-house type alumina particles are exposed, and the sample is fixed onto a double-sided tape by pressing, and composition analysis can be performed under the following conditions using the above X-ray photoelectron spectroscopic (XPS) device.

X-ray source: monochromatic AlKα, beam diameter 100 μmφ, output 25 W

Measurement: area measurement (1,000 μm square), n=3

Charging correction: C1s=284.8 eV

When the alumina particles further contain silicon, Si is detected through XRF analysis. In the alumina particles according to the embodiment, the molar ratio of Si to Al [Si]/[Al] acquired through XRF analysis is preferably 0.0003 or more and 0.1 or less, more preferably 0.0005 or more and 0.08 or less, still more preferably 0.005 or more and 0.05 or less, and most preferably 0.005 or more and 0.01 or less.

When the value of the molar ratio [Si]/[Al] acquired through the XRF analysis is within the above range, this is preferable since alumina particles having a card-house structure formed of plate-like alumina can be easily acquired and the obtained alumina particles can exhibit excellent fluidity and crushing strength.

The alumina particles contain silicon corresponding to silicon or a silicon compound used in the production method. The amount of silicon with respect to 100 mass % of the alumina particles acquired in XRF analysis is, in terms of silicon dioxide ($SiO_2$), preferably 0.01 mass % or more and 8 mass % or less, more preferably 0.1 mass % or more and 5 mass % or less, most preferably 0.5 mass % or more and 4 mass % or less, and particularly preferably 0.5 mass % or more and 2 mass % or less.

When the amount of silicon is within the above range, this is preferable since alumina particles having a card-house structure formed of plate-like alumina can be easily acquired and the obtained alumina particles can exhibit excellent fluidity and crushing strength.

XRF analysis is performed under the same conditions as the measurement conditions described in examples to be described below or under compatible conditions in which the same measurement results are obtained.

(Germanium)

The alumina particles may contain germanium. In addition, the alumina particles may contain germanium in the surface layer.

Although it differs depending on the raw materials used, the alumina particles may contain, as germanium or a germanium compound, for example, at least one selected from the group consisting of compounds such as Ge, $GeO_2$, GeO, $GeCl_2$, $GeBr_4$, $GeI_4$, $GeS_2$, AlGe, GeTe, $GeTe_3$, $As_2$GeSe, $GeS_3As$, SiGe, $Li_2Ge$, FeGe, SrGe, and GaGe, and oxides thereof, and the above substance may be contained in the surface layer.

Here, the "germanium or a germanium compound" contained in the alumina particles according to the embodiment and a "raw material germanium compound" used as a raw material shape-controlling agent may be the same type of germanium compound.

The alumina particles according to the embodiment may contain germanium or a germanium compound in the surface layer. When the surface layer contains germanium or a germanium compound, it is more difficult for a device to become worn. Alumina is a substance with a Mohs hardness of 9 and is classified as a very hard substance. On the other hand, since the Mohs hardness of germanium or a germanium compound is, for example, about 6 in germanium dioxide ($GeO_2$), when the alumina particles according to the embodiment contain germanium or a germanium compound, wearing of a device can be reduced. In addition, when the alumina particles according to the embodiment contain germanium or a germanium compound in the surface layer, the device comes in contact with germanium or a germanium compound on the surface rather than alumina of plate-like alumina particles, and wearing of a device can be further reduced.

When germanium or a germanium compound is contained in the surface layer of the alumina particles, significant reduction in wearing of a device is exhibited. Here, "surface layer" refers to a layer within 10 nm from the surface of the plate-like alumina particles according to the embodiment. The distance corresponds to a detection depth in XPS. Here, the surface layer containing germanium is a very thin layer of 10 nm, and for example, in the case of germanium dioxide, if there are many defects and the like in a germanium dioxide structure on the surface or an interface, even if the hardness of the germanium dioxide is much lower than the original Mohs hardness (6.0), compared with germanium dioxide with no or few structural defects, wearing of the device can additionally be significantly reduced.

In the alumina particles, germanium or a germanium compound is preferably unevenly distributed in the surface layer. Here, "unevenly distributed in the surface layer" means a state in which the mass of germanium or a germanium compound per unit volume in the surface layer is larger than the mass of germanium or a germanium compound per unit volume in a part other than the surface layer. Uneven distribution of germanium or a germanium compound in the surface layer can be determined by comparing results of surface analysis through XPS with overall analysis through XRF. When germanium or a germanium compound is unevenly distributed in the surface layer, with a smaller amount thereof, the amount of wear can be reduced compared to when germanium or a germanium compound is present not only on the surface layer but also in a part other than the surface layer (inner layer), wearing of the device based on germanium or a germanium compound.

The amount of germanium with respect to 100 mass % of the alumina particles acquired in XRF analysis is, in terms of germanium dioxide ($GeO_2$), preferably 0.01 mass % or more and 8 mass % or less, more preferably 0.1 mass % or more and 5 mass % or less, and most preferably 0.5 mass % or more and 4 mass % or less.

(Mullite)

The alumina particles according to the embodiment may contain mullite in the surface layer. When the surface layer contains mullite, it is more difficult for a device to become worn. Alumina is a substance with a Mohs hardness of 9 and is classified as a very hard substance. On the other hand, the Mohs hardness of mullite is 7.5. Therefore, when the alumina particles according to the embodiment contains mullite in the surface layer, the device comes in contact with mullite on the surface rather than alumina of alumina particles, and wearing of a device can be reduced.

When mullite is contained in the surface layer of the alumina particles, significant reduction in wearing of a device is exhibited. "Mullite" that the alumina particle according to the embodiment may include in the surface layer is a composite oxide of Al and Si and represented by $Al_xSi_yO_z$, but the values of x, y, and z are not particularly limited. A more preferable range is $Al_2Si_1O_5$ to $Al_6Si_2O_{13}$. In the examples described below, the XRD peak intensities of alumina particles including $Al_{2.85}Si_1O_{6.3}$, $Al_3Si_1O_{6.5}$, $Al_{3.67}Si_1O_{7.5}$, $Al_4Si_1O_8$, or $Al_6Si_2O_{13}$ are confirmed. The alumina particles may include at least one kind of compound selected from the group consisting of $Al_{2.85}Si_1O_{6.3}$, $Al_3Si_1O_{6.5}$, $Al_{3.67}Si_1O_{7.5}$, $Al_4Si_1O_8$, and $Al_6Si_2O_{13}$ in the surface layer. Here, the "surface layer" refers to a region 10 nm or less from the surface of the alumina particles. This distance corresponds to the detection depth of XPS used for measurement in the examples. Here, the mullite surface layer is a very thin layer of 10 nm, and if there are many defects and the like in a mullite crystal on the surface or an interface, even if the hardness of the mullite surface layer is much lower than the original Mohs hardness (7.5) of mullite, compared with mullite with no or few crystal defects, wearing of a device can additionally be significantly reduced.

In the alumina particles, mullite is preferably unevenly distributed in the surface layer. Here "unevenly distributed in the surface layer" means a state in which the mass of mullite per unit volume in the surface layer is larger than the mass of mullite per unit volume in a part other than the surface layer. Unevenly distribution of mullite in the surface layer can be determined by comparing results of surface analysis through XPS with overall analysis through XRF. When mullite is unevenly distributed in the surface layer, with a smaller amount thereof, the amount of wear can be reduced compared to when mullite is present not only on the surface layer but also in a part other than the surface layer (inner layer), wearing of a device based on mullite.

In addition, mullite in the surface layer may form a mullite layer or may be in a state in which mullite and alumina are mixed. The interface between mullite and alumina in the surface layer may be in a state in which mullite and alumina are physically in contact with each other, and mullite and alumina may form a chemical bond such as Si—O—Al. In contrast to a combination of alumina and $SiO_2$, in a combination of alumina and mullite as essential components, since the degree of similarity of the constituent atomic compositions is higher, when the flux method is used, in consideration of ease of formation of chemical bonds such as Si—O—Al bonds, alumina and mullite can bond more strongly and made more difficult to separate. Therefore, when the amount of Si is at the same level, a combination of alumina and mullite as essential components is more preferable because it can make the device difficult to wear for a longer time. Although the technical effects of combining alumina and mullite as essential components can be expected not only with alumina and mullite, but also with alumina, mullite, and silica, out of these two, the technical effects are more significant in the former combination.

In addition, determination of the presence or absence of mullite on the surface of the alumina particles can be performed using a wide angle X-ray diffraction (XRD) device such as an Ultima IV (commercially available from Rigaku Corporation).

For example, in the same manner as above, an inorganic coating part of composite particles is dissolved and card-house type alumina particles are exposed, and a sample is placed on a measurement sample holder having a depth of 0.5 mm and filled so that it is flattened with a certain load, and this is set in the wide angle X-ray diffraction (XRD) device, and measurement is performed under conditions of Cu/Kα rays, 40 kV/40 mA, a scan speed of 2 degree/min, and a scan range of 10 to 70 degrees.

The peak height of mullite observed at 2θ=26.2±0.2 degrees is set as A, the peak height of α-alumina on the (104) plane observed at 2θ=35.1±0.2 degrees is set as B, and the base line value at 2θ=30±0.2 degrees is set as C, and it is determined whether there is mullite according to the following formula. The value of R is preferably, for example, 0.02 or more. As shown in the following formula, R is a ratio of the height A of the peak of mullite to the height B of the peak on the (104) plane of α-alumina.

$$R=(A-C)/(B-C)$$

[Molybdenum]

Alumina particles having a card-house structure contain molybdenum.

In the method of producing alumina particles to be described below, molybdenum may be derived from a molybdenum compound used as a flux agent.

Molybdenum has a catalyst function and an optical function. In addition, when molybdenum is used, in the production method to be described below, it is possible to produce alumina particles having excellent fluidity.

The molybdenum is not particularly limited, and not only molybdenum metal but also molybdenum oxide, a partially reduced molybdenum compound, molybdate, or the like are included. Molybdenum may be included in any of multiple forms or a combination that a molybdenum compound is capable of having and may be included in the plate-like alumina particle as α-$MoO_3$, β-$MoO_3$, $MoO_2$, $MoO$, a molybdenum cluster structure, or the like.

The form of molybdenum being contained is not particularly limited, and molybdenum may be contained in the form of being attached to the surface of the plate-like alumina of alumina particles having a card-house structure, in the form of being substituted into part of aluminum in the crystal structure of alumina, or in a combined form thereof.

The amount of molybdenum with respect to 100 mass % of the alumina particles acquired through XRF analysis is, in terms of molybdenum trioxide, preferably 10 mass % or less, and by adjusting a firing temperature, a firing time, and a molybdenum compound sublimation rate, more preferably 0.001 to 5 mass %, most preferably 0.01 to 5 mass %, and particularly preferably 0.1 to 1.5 mass %. When the amount of molybdenum is 10 mass % or less, this is preferable since the a single crystal quality of alumina is improved.

XRF analysis is performed under the same conditions as the measurement conditions described in examples to be described below or under compatible conditions in which the same measurement results are obtained.

Determination of the amount of Mo on the surface of the alumina particles can be performed using the above X-ray photoelectron spectroscopic (XPS) device.

For example, in the same manner as above, an inorganic coating part of composite particles is dissolved and card-house type alumina particles are exposed, and a sample is fixed onto a double-sided tape by pressing, and composition analysis can be performed under the following conditions using the X-ray photoelectron spectroscopic (XPS) device. When [Mo]/[Al] (molar ratio) obtained from XPS analysis results is the amount of Mo on the surface of the card-house type alumina particles, the amount of Mo is preferably 0.0005 or more.

X-ray source: monochromatic AlKα, beam diameter 100 μmφ, output 25 W
Measurement: area measurement (1,000 μm square), n=3
Charging correction: C1s=284.8 eV

[Potassium]

The alumina particles having a card-house structure may further contain potassium.

Potassium may be derived from potassium that can be used as a flux agent in the method of producing alumina particles to be described below.

By utilizing potassium, the particle size of alumina particles can be appropriately improved in the method of producing alumina particles to be described below.

Potassium is not particularly limited, and in addition to potassium metal, potassium oxides, partially reduced potassium compounds, and the like may be used.

A form in which potassium is contained is not particularly limited, and potassium may be contained in a form in which potassium adheres to the surface of the plate-like alumina of alumina particles having a card-house structure, a form in which some aluminum of a crystal structure of alumina is replaced with potassium, or in a combination thereof.

The amount of potassium with respect to 100 mass % of the alumina particles acquired through XRF analysis is, in terms of potassium oxide ($K_2O$), preferably 0.01 mass % or more, more preferably 0.01 to 1.0 mass %, more preferably 0.03 to 0.5 mass %, and particularly preferably 0.05 to 0.3 mass %. Alumina particles in which the amount of potassium is within the above range are preferable because they have a card-house structure and an appropriate value of average particle size and the like.

XRF analysis is performed under the same conditions as the measurement conditions described in examples to be described below or under compatible conditions in which the same measurement results are obtained.

[Inevitable Impurities]

The alumina particles may contain inevitable impurities.

Inevitable impurities refer to impurities which are derived from metal compounds used in production, and although they are present in raw materials, inevitably incorporated into alumina particles in the production step, and are basically unnecessary, they are contained in a small amount but do not affect the characteristics of the alumina particles.

The inevitable impurities are not particularly limited, and examples thereof include magnesium, calcium, strontium, barium, scandium, yttrium, lanthanum, cerium, and sodium. These inevitable impurities may be contained alone or in combination of two or more types thereof.

The amount of inevitable impurities in the alumina particles with respect to the mass of the alumina particles is preferably 10,000 ppm or less, more preferably 1,000 ppm or less, and most preferably 10 to 500 ppm.

(Other Atoms)

Other atoms refer to atoms which are intentionally added to alumina particles in order to impart mechanical strength or electric and magnetic functions as long as effects of the present invention are not impaired.

The other atoms are not particularly limited, and examples thereof include zinc, manganese, calcium, strontium, and yttrium. One types of these other atoms alone or a combination of two or more types thereof may be used.

The amount of other atoms in the alumina particles with respect to the mass of the alumina particles is preferably 5 mass % or less and more preferably 2 mass % or less.

[Crushing Strength of Alumina Particles Having a Card-House Structure]

When the alumina particles have a higher crushing strength, this is preferable since the original fluidity is impaired when the card-house structure is broken according to mechanical dispersion such as compression and shearing. The crushing strength varies depending on the position, number, and area of the plate-like alumina intersections, and the thickness, aspect ratio, and the like of the plate-like alumina, and the crushing strength required for various applications differs, and in consideration of practicality, the crushing strength is preferably 1 MPa to 100 MPa, more preferably 20 MPa to 100 MPa, and most preferably 50 MPa to 100 MPa.

The crushing strength of alumina particles can be measured using, for example, microparticle crushing force measuring device NS-A100 (commercially available from Nano Seeds Corporation), MCT-510 (commercially available from Shimadzu Corporation), or the like. A difference between the peak value during crushing and the base line (in a condition in which no force is applied) is set as a crushing force F [N], and the crushing strength S [Pa] is an average value of 10 values calculated according to the following formula.

$$S=2.8F/(\pi \cdot D^2)$$

Here, in the formula, F represents a crushing force [N], and D represents a particle size [m].

Here, as described above, the alumina particles have a card-house structure which is are formed of three or more pieces of plate-like alumina and in which the pieces of alumina are fixed to each other. The inventors found that, regarding alumina particles, those appropriately containing silicon atoms and/or inorganic silicon compounds have higher crushing strength than those containing no silicon atoms and/or inorganic silicon compounds. The crushing strength varies depending on the amount of silicon atoms and/or inorganic silicon compounds, and as the content appropriately increases, the fluidity and crushing strength of particles increase. In addition, for example, in the production method, when specific production conditions are used, it is possible to increase the crushing strength. In production conditions, the crushing strength can be arbitrarily adjusted. For example, the crushing strength of alumina particles can be further increased by further increasing the firing temperature.

Alumina particles have a card-house structure which is formed of three or more pieces of plate-like alumina and in which the pieces of plate-like alumina are fixed to each other and may have an average particle size of 1 to 1,000 µm. More appropriately, the three or more pieces of plate-like alumina preferably intersect and adhere at two or more locations in the internal structure of the alumina particles as a fixed card-house structure, and alumina particles in which planar directions of flat planes intersecting are randomly arranged are preferable.

Twin alumina particles known in the related art have a structure with conspicuous corners in terms of their shapes, and have a shape that is more difficult to roll than alumina particles constituting the composite particles according to the embodiment, and thus sufficient fluidity as a filler (filling agent) is not obtained. In addition, if alumina particles having the same card-house structure as the alumina particles constituting the composite particles according to embodiment are used, those having an appropriately large average particle size have excellent fluidity. The alumina particles according to the embodiment exhibit particularly excellent fluidity due to a synergistic effect of the card-house structure and its preferable average particle size.

[Specific Surface Area]

The specific surface area of the alumina particle powder is generally in a range of 0.001 to 50 m$^2$/g, and is preferably in a range of 0.01 to 10 m$^2$/g and more preferably in a range of 0.05 to 5.0 m$^2$/g. Within the above range, the number of pieces of plate-like alumina forming the card-house structure is appropriate and functions inherent to alumina are sufficiently obtained, and processability is excellent without significant increase in viscosity when slurried.

Here, the specific surface area can be measured according to JIS Z 8830: BET1 point method (adsorption gas: nitrogen) or the like.

[Porosity]

When alumina particles have a card-house structure which is formed of three or more pieces of plate-like alumina and in which the pieces of plate-like alumina are fixed to each other, since the alumina particles have voids therein, and the shape tends to be uniform and the fluidity tends to be improved as the proportion of voids increases, the porosity is preferably 10 volume % or more, and more preferably 30 volume % or more. In addition, when the proportion of voids increases, since crushing strength of a powder decreases, the porosity is preferably 90 volume % or less, and more preferably 70 volume % or less. When the porosity is within this range, the bulk specific gravity is appropriate, fluidity is not impaired, and handling properties are also favorable. The porosity can be obtained by measurement using a gas adsorption method, a mercury press-in method, or the like such as JIS Z 8831.

Simply, regarding the porosity, alumina particles are mixed with a liquid curable compound such as an epoxy compound and a (meth)acrylic monomer and then cured. Then, the cross section is cut and ground, and then observed under an SEM, and thus the porosity can be estimated.

<Inorganic Coating Part>

The inorganic coating part coats at least a part of the surface of the plate-like alumina, and is preferably composed of an inorganic coating layer that coats at least a part of the surface of the plate-like alumina. In other words, at least a part of the surface of the composite particles is coated with the inorganic coating part, and preferably at least a part of the surface of the composite particles is coated with the inorganic coating layer.

As described above, the inorganic coating part is provided on the surface of the plate-like alumina. "On the surface of the plate-like alumina" refers to outside the surface of the plate-like alumina. Therefore, the inorganic coating part formed outside the surface of the plate-like alumina is clearly distinguished from the surface layer which is formed inside the surface of the plate-like alumina and contains mullite and germanium.

The inorganic chemical species constituting the inorganic coating part may be relatively larger than the alumina particles. However, it is preferable that the chemical species is relatively smaller than the alumina particles in that the inorganic coating part having an arbitrary coating amount (or coating thickness) can be reliably provided depending on the desired purpose. An example of the combination include alumina particles on the order of m and inorganic chemical species of 150 nm or less. When an inorganic coating part is provided on the outside of the surface of the alumina particles using an inorganic chemical species smaller than the alumina particles, the inorganic coating part can be provided on a part of the outside of the surface of the alumina particles by using a small amount of the inorganic chemical species, such that the surface of the alumina surface may be clearly observed. Alternatively, the inorganic coating part can be provided on the surface of the alumina particles in a state where the inorganic chemical species are stacked on the surface of the alumina particles by using a large amount of the inorganic chemical species, such that the surface of the alumina particles are no observable. A shape of the inorganic chemical species constituting the inorganic coating part is not limited. For example, the shape is preferably spherical or polyhedral in that it is possible to form the closest-packing structure and reliably mask the surface of the alumina particles with the minimum amount of the inorganic chemical species to be used.

The composite particle of the present invention is composed of alumina particles containing molybdenum and an inorganic coating part made of an inorganic chemical species, and has excellent properties that cannot be expressed by a simple mixture of alumina particles and inorganic chemical species. In the composite particles of the present invention, in the case of a combination of alumina particles containing molybdenum of m order and non-aggregated inorganic chemical species of 150 nm or less, for example, due to intermolecular force or in some cases local chemical reaction, interaction between the alumina particles and the inorganic chemical species increases. As a result, particularly excellent properties can be reliably expressed, such as higher coating characteristics, a more uniform inorganic coating part, and the obtained inorganic coating part being difficult to be peeled off from the alumina particles. The contribution of molybdenum contained in the alumina particles can also be expected. Independent inorganic species of nm order can be obtained by, for example, mechanically crushing inorganic species of m order. However, since re-aggregation thereof occurs immediately, the chemical species are not easy to handle. When alumina particles containing no molybdenum or agglomerated inorganic species are used, only a simple mixture of the alumina particles and the inorganic chemical species is formed. Such simple mixture of the alumina particles and the inorganic chemical species do not exhibit the properties of the composite particles of the present invention. According to the composite particle manufacturing method of the present invention described later, composite particles with higher coating efficiency can be manufactured more reliably.

The inorganic coating part can be made of, for example, an oxide or a metal. Examples of oxides include one or more selected from the group consisting of titanium oxide ($TiO_2$), iron oxide ($Fe_2O_3$) and silica ($SiO_2$). Examples of metals include one or more selected from the group consisting of silver (Ag), nickel (Ni), copper (Cu), gold (Au) and platinum (Pt).

The form of the oxide or metal constituting the inorganic coating part is not particularly limited, and examples thereof include particle forms such as a spherical shape, a needle shape, a polyhedral shape, a disk shape, a hollow shape, and a porous form. The average particle size of particles made of an oxide or metal having a particle form is, for example, preferably 1 nm or more and 500 nm or less, and more preferably 5 nm or more and 200 nm or less. The particles made of an oxide or a metal may be crystalline or amorphous.

When the inorganic coating part is an inorganic coating layer, the thickness of one inorganic coating layer formed on the surface of the plate-like alumina is preferably 20 nm or more and 400 nm or less, preferably 30 nm or more and 300 nm or less, and particularly preferably 30 nm or more and 200 nm or less.

When the inorganic coating layer is made of titanium oxide, a desired interference color can be obtained by changing the thickness of the inorganic coating layer. When the thickness of the inorganic coating layer increases, the color intensity increases.

When the inorganic coating layer is made of iron oxide, the color of the composite particles is red or reddish brown.

The inorganic coating part may be composed of one layer or may be composed of a plurality of layers. In addition, when the inorganic coating part is composed of a plurality of layers, the plurality of layers may be composed of different materials.

[XRF Coating Rate of Composite Particles]

The XRF coating rate (%) of the composite particles according to the embodiment can be obtained using, for example, an X-ray fluorescence (XRF) analyzing device to be described below.

The XRF coating rate (%) is obtained based on, for example, the amount of metal oxide constituting the inorganic coating part with respect to the amount of aluminum oxide constituting card-house type alumina particles, and can be obtained, for example, from $[MO_x]/[Al_2O_3]$(mass ratio) obtained from the XRF analysis results.

[Fluidity of Composite Particle Powder]

Regarding the composite particle powder according to the embodiment, since alumina particles themselves constituting the composite particles have a unique structure and preferably have a specific average particle size, the composite particle powder has superior fluidity as powder compared to plate-like alumina particles and twin alumina particles. In order to further increase fluidity, in alumina particles constituting one unit of a card-house structure, the shape of the volume-based maximum enveloping surface including all pieces of plate-like alumina constituting the particles is preferably a spherical shape or substantially spherical shape (refer to FIG. 2). In addition, as necessary, in order to further improve fluidity, a lubricant, fine particle silica, and the like may be optionally added.

Fluidity of the composite particle powder can be obtained, for example, by measuring an angle of repose according to JIS R9301-2-2. The angle of repose is preferably 500 or less and more preferably 400 or less because, in machine transportation using feeders, hoppers, or the like, problems such as hopper bridges, feed necks, non-uniform supply, and a reduced discharge amount are unlikely to occur.

[Specific Surface Area of Composite Particle Powder]

The specific surface area of the composite particle powder is generally in a range of 0.01 to 100 $m^2/g$, and preferably in a range of 0.05 to 80 $m^2/g$, and more preferably in a range of 0.1 to 50 $m^2/g$. Within the above range, processability is excellent without significant increase in viscosity when slurried.

The specific surface area value ($m^2/g$) is determined by nitrogen adsorption and desorption according to a BET one-point method using a flow type specific surface area automatic measuring device (Flowsorb 112300 commercially available from Shimadzu Corporation).

[Crushing Strength of Composite Particles]

It is preferable that the composite particles according to the present embodiment have a higher crushing strength, because the original fluidity is impaired when the card-house structure is broken according to mechanical dispersion such as compression and shearing. The crushing strength varies depending on the position, number, and area of plate-like alumina intersections, and the thickness, aspect ratio, and the like of the plate-like alumina, and the crushing strength required for various applications differs, and in consideration of practicality. The crushing strength is preferably 1 MPa to 200 MPa, more preferably 20 MPa to 150 MPa, and most preferably 50 MPa to 120 MPa.

The crushing strength of composite particles (powder) can be measured using the above measuring device and the same measurement method used when the crushing strength of alumina particles having a card-house structure is measured.

Here, as described above, the composite particles include alumina particles having a card-house structure which is formed of three or more pieces of plate-like alumina and in which the pieces of alumina are fixed to each other. The inventors found that, regarding alumina particles, those appropriately containing silicon atoms and/or inorganic silicon compounds have higher crushing strength than those containing no silicon atoms and/or inorganic silicon compounds. The crushing strength varies depending on the amount of silicon atoms and/or inorganic silicon compounds, and as the content appropriately increases, the fluidity and crushing strength of particles can increase. In addition, for example, in the production method, when specific production conditions are used, it is possible to increase the crushing strength. In production conditions, the crushing strength can be arbitrarily adjusted. For example, the crushing strength of composite particles can be further increased by further increasing the firing temperature.

[Organic Compound Layer on Composite Particles Surface]

In one embodiment, an organic compound layer may be provided on the surface of the composite particles. An organic compound constituting the organic compound layer is present on the surface of the composite particles and has a function of adjusting surface physical properties of the composite particles. For example, composite particles containing an organic compound on the surface may improve affinity with a resin so that a function of the alumina particles as a filler can be exhibited to a maximum level.

The organic compound is not particularly limited, and examples thereof include organosilanes, alkylphosphonic acids, and polymers.

Examples of organosilanes include alkyltrimethoxysilanes with alkyl groups having 1 to 22 carbon atoms such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane, and alkyltrichlorosilanes, 3,3,3-trifluoropropyltrimethoxysilane, tridecafluoro-1,1,2,2-tetrahydrooctyl)trichlorosilanes, phenyltrimethoxysilane, phenyltriethoxysilane, p-chloromethylphenyltrimethoxysilane, and p-chloromethylphenyltriethoxysilane.

Examples of phosphonic acids include methylphosphonic acid, ethylphosphonic acid, propylphosphonic acid, butylphosphonic acid, pentylphosphonic acid, hexylphosphonic acid, heptylphosphonic acid, octylphosphonic acid, decylphosphonic acid, dodecylphosphonic acid, octadecylphosphonic acid, 2-ethylhexylphosphonic acid, cyclohexylmethylphosphonic acid, cyclohexylethylphosphonic acid, benzylphosphonic acid, phenylphosphonic acid, and dodecylbenzenephosphonic acid.

Regarding the polymer, for example, poly(meth)acrylates can be appropriately used. Specific examples thereof include polymethyl(meth)acrylates, polyethyl(meth)acrylates, polybutyl(meth)acrylates, polybenzyl(meth)acrylates, polycyclohexyl(meth)acrylates, poly t-butyl(meth)acrylates, polyglycidyl(meth)acrylates, and polypentafluoropropyl(meth)acrylates, and also include polymers such as general-purpose polystyrenes, polyvinyl chlorides, polyvinyl acetates, epoxy resins, polyesters, polyimides, and polycarbonates.

Here, one or two or more of the above organic compounds may be contained.

A form in which an organic compound is contained is not particularly limited, and an organic compound may be covalently linked to alumina or may coat alumina or the material of the inorganic coating part.

The amount of the organic compound with respect to the mass of the alumina particles is preferably 20 mass % or less and more preferably 10 mass % or more and 0.01 mass % or less. When the amount of the organic compound is 20 mass % or less, this is preferable since physical properties derived from the composite particles can be easily exhibited.

<Method of Producing Composite Particles>

Next, a method of producing composite particles according to an embodiment will be exemplified in detail. The method of producing composite particles according to the present embodiment is not limited to the following method of producing composite particles.

The method of producing composite particles according to the present embodiment includes a step of firing a mixture including an aluminum compound containing aluminum, a molybdenum compound containing molybdenum, and a shape-controlling agent for controlling the shape of alumina particles and producing alumina particles having a card-house structure in which three or more pieces of plate-like alumina are fixed to each other, and a step of forming an inorganic coating part on the surface of the plate-like alumina.

In the alumina particles constituting the composite particles according to the embodiment, the average particle size, fluidity, specific surface area, mechanical strength, and porosity, and the thickness, aspect ratio, and the like of the plate-like alumina can be adjusted in a production method to be described below in detail. For example, when the flux method is used as a production method, the above factors can be adjusted according to the type of a molybdenum compound (more preferably a potassium compound) as a flux agent, and an aluminum compound; the average particle size of the aluminum compound; the purity of the aluminum compound; a proportion of at least one shape-controlling agent selected from among silicon, a silicon compound and a germanium compound used; and the type of another shape-controlling agent; a proportion of another shape-controlling agent used; the present form of at least one shape-controlling agent selected from among silicon, a silicon compound and a germanium compound and an aluminum compound; the present form of another shape-controlling agent and an aluminum compound; and the like.

The alumina particles may be obtained based on any production method as long as they can have a card-house structure. However, it is not preferable that such alumina having a unique structure called a card-house structure is obtained by using a method including using alumina having an existing structure and performing a post-treatment, because more producing steps are required and productivity is inferior. And in consideration of productivity, for example, it is preferable to produce alumina particles from an existing alumina raw material by using a method that can satisfy all requirements at once. That is, the obtained alumina particles can be selectively formed as a structure having a card-house structure; can contain molybdenum therein easily; and additionally, can contain potassium, silicon, germanium, and the like therein easily.

That is, in order to obtain alumina particles, since superior fluidity and dispersibility of the composite particles and excellent productivity can be obtained, an aluminum compound is preferably fired in the presence of a molybdenum compound; in the presence of at least one shape-controlling agent selected from among silicon, a silicon compound and a germanium compound; and as necessary, in the presence of another shape-controlling agent.

In addition, since almost all of the produced alumina particles can have a card-house structure and the productivity is superior, an aluminum compound is preferably fired in the presence of a molybdenum compound and a potassium compound; in the presence of at least one shape-controlling agent selected from among silicon, a silicon compound and a germanium compound, and as necessary, in the presence of another shape-controlling agent.

More specifically, a preferable method of producing alumina particles includes a step of firing an aluminum compound in the presence of a molybdenum compound and at least one shape-controlling agent selected from among silicon, a silicon compound and a germanium compound (firing step). The firing step may be a step of firing a mixture obtained in a step of obtaining the mixture to be fired (mixing step). Preferably, the mixture further contains a potassium compound. Preferably, the mixture further contains a metal compound to be described below. Regarding the metal compound, an yttrium compound is preferable.

When an organic compound is used as the molybdenum compound or silicon compound, its organic component is burned off by firing. That is, after a molybdenum compound reacts with an aluminum compound at a high temperature to form an aluminum molybdate, when the aluminum molybdate decomposes into alumina and molybdenum oxide at a higher temperature, molybdenum is incorporated into the alumina particles, and thus alumina particles can be more easily obtained. Molybdenum oxide sublimates, but it can be collected and reused. Hereinafter, this production method will be referred to as a flux method. The flux method will be described below in detail.

The shape-controlling agent has an important role in plate-like crystal growth. In the flux method using a molybdenum compound which is generally performed, molybdenum oxide reacts with an aluminum compound to form aluminum molybdate, and next, change in chemical potential during decomposition of aluminum molybdate serves as a driving force for crystallization, and thus hexagonal bipyramidal polyhedral particles with the developed euhedral face (113) are formed. In the production method according to the embodiment, it is thought that, when the shape-controlling agent is localized in the vicinity of the surface of particles in the α-alumina growth process, the growth of the euhedral face (113) is significantly inhibited, and as a result, growth of the crystal orientation in the planar direction is relatively fast, the (001) plane or the (006) plane grows, and plate-like forms can be formed. When the molybdenum compound is used as a flux agent, it is possible to more easily form alumina particles made of plate-like alumina containing molybdenum having a high a crystallization rate and particularly an α crystallization rate of 90% or more.

Here, the above mechanism is only a speculation, and even if effects of the present invention are obtained through a mechanism different from the above mechanism, the mechanism is included in the technical scope of the present invention.

In the alumina particles, when the molybdenum compound is used, alumina has a high a crystallization rate and has an euhedral face, and thus excellent dispersibility, mechanical strength, and high thermal conductivity with respect to the matrix can be realized.

In addition, in the alumina particles obtained in the above production method, molybdenum is contained in the particles. Therefore, the isoelectric point of the zeta potential is shifted to the acidic side compared to general alumina, and thus the dispersibility is excellent. In addition, using characteristics of molybdenum contained in the alumina particles, applications to an oxidation reaction catalyst and an optical material are possible.

[Method of Producing Alumina Particles According to Flux Method]

The method of producing alumina particles is not particularly limited. However, a production method according to a flux method using a molybdenum compound is preferably applied because it is then possible to appropriately control alumina having a high a crystallization rate at a relatively low temperature.

More specifically, a preferable method of producing alumina particles includes a step of firing an aluminum compound in the presence of a molybdenum compound, at least one shape-controlling agent selected from the group consisting of silicon, a silicon compound and a germanium compound, and as necessary, another shape-controlling agent.

The inventors newly found that, in the flux method, when a production method in which a molybdenum compound is used as a flux agent, a shape-controlling agent is used in combination, and these are mixed with an aluminum compound and fired is used, the size of the raw material aluminum compound, an amount of the molybdenum compound used (additionally an amount of a potassium compound used when the potassium compound is used as a flux agent), and an amount of the shape-controlling agent used are important factors for selectively producing alumina particles.

In the flux method, a molybdenum compound and a potassium compound are preferably used as a flux agent.

Here, a compound containing molybdenum and potassium as a flux agent can be produced, for example, in a firing process using a molybdenum compound and a potassium compound as raw materials which are cheaper and easily available. As an example of both of a case in which the molybdenum compound and the potassium compound are used as a flux agent, and a case in which a compound containing molybdenum and potassium is used as a flux agent are combined, the case in which the molybdenum compound and the potassium compound are used as a flux agent will be described.

In a method of producing alumina particles in which a molybdenum compound is used as an essential flux agent, a shape-controlling agent is used in combination, and these are mixed with an aluminum compound and the resulting mixture is fired, compared to the case in which only a molybdenum compound such as molybdenum trioxide is used, it is preferable that a molybdenum compound and a potassium compound are used as a flux agent or a compound containing molybdenum and potassium is used as a flux agent. This is because that if the firing step is performed in the presence of a compound containing molybdenum and potassium which is difficult to vaporize, deterioration of a firing operation environment is reduced without the flux agent being released to the outside of the system. And additionally, this is because that a compound containing molybdenum and potassium contained in the mixture of alumina particles and flux agent particles produced in the cooling step is often highly water-soluble, and thus a larger amount of molybdenum can be more easily removed from alumina.

When a molybdenum compound and a potassium compound are used as a flux agent or when a compound containing molybdenum and potassium is used as a flux agent, and when the above cooling step is included, alumina particles having a card-house structure can be obtained without the need for strong crushing, and additionally, a very high yield of alumina particles having a card-house structure can be obtained. It is thought that, this is because, in such a configuration, since the flux agent fills between alumina particles having a card-house structure, the flux agent serves as a spacer, and as a result, the particles are prevented from being fused. Therefore, the flux agent can be easily removed in the post-treatment step.

In order to prevent particles from being fused, an amount of the flux agent used (an amount of a molybdenum compound and potassium compound added when a total amount of raw materials in terms of oxide is set as 100 mass %) in terms of $Mo_2K_2O_7$ is preferably 2 mass % or more.

[Mixing Step]

The mixing step is a step of mixing raw materials such as an aluminum compound, a molybdenum compound, and a shape-controlling agent to prepare a mixture. The mixture may further contain a potassium compound. The amounts of the mixture will be described below.

(Aluminum Compound)

The raw aluminum compound is a raw material of the alumina particles according to the embodiment. The aluminum compound is not particularly limited as long as the aluminum compound is turned into alumna particles by a heat treatment, and it is possible to use, for example, aluminum chloride, aluminum sulfate, basic aluminum acetate, aluminum hydroxide, boehmite, pseudo-boehmite, transition alumina (γ-alumina, δ-alumina, θ-alumina, or the like), α-alumina, mixed alumina particles having two or more kinds of crystal phases, or the like, and aluminum hydroxide and/or transition alumina are preferable.

In addition, the aluminum compound may be the aluminum compound alone or a composite body of the aluminum compound and the organic compound. For example, an organic/inorganic composite body obtained by modifying the aluminum compound by using an organosilane, an aluminum compound composite body to which a polymer is adsorbed, and the like can also be preferably used. In the case of using these composite bodies, the content rate of the organic compound is not particularly limited, and the content rate is preferably 60% by mass or less and more preferably 30% by mass or less since it is possible to efficiently manufacture alumina particles having a card-house structure.

The specific surface area of the aluminum compound is not particularly limited. The specific surface area is preferably large in order for the molybdenum compound to act effectively, but the aluminum compound can be used as a raw material regardless of the specific surface area by adjusting a firing condition or the amount of the molybdenum compound used.

According to the flux method described in detail below, it is possible to preferably use the aluminum compound regardless of the shape of the aluminum compound in the embodiment such as any one of a spherical structure, an irregular shape, a structure having a high aspect ratio (for example, a wire, a fiber, a ribbon, a tube, or the like), a sheet, and the like, and in order to improve fluidity of powder, a spherical aluminum compound is preferably used because the obtained alumina particles are closer to a spherical shape.

In addition, in a method of producing alumina particles from an aluminum compound, the average particle size of alumina particles also basically reflect the particle size of the raw material aluminum compound.

According to the following flux method, it is speculated that, in the firing step, mainly, crystals of plate-like alumina are formed in the raw material aluminum compound particles and intersection of three or more pieces of adjacent plate-like alumina proceeds and fixing is performed, and thus a card-house structure is formed. Therefore, it is speculated that the average particle size of the obtained alumina particles having a card-house structure mainly reflects the average particle size of the raw material aluminum particles.

Accordingly, when an aluminum compound having a smaller average particle size is used as a raw material, alumina particles having a smaller average particle size are easily obtained, and when an aluminum compound having a larger average particle size is used, alumina particles having a larger average particle size are easily obtained.

The alumina particles constituting the composite particles preferably have an average particle size of 3 µm or more and 1,000 µm or less. Therefore, an aluminum compound that has the same as or has substantially the same average particle size as those corresponding to alumina particles having a specific average particle size to be produced within the above range may be used.

For example, in a method of producing alumina particles including a step of firing an aluminum compound in the presence of a molybdenum compound, at least one shape-controlling agent selected from among silicon, a silicon compound and a germanium compound, and as necessary, another shape-controlling agent, alumina particles having a card-house structure can be obtained by forming plate-like alumina, and bringing the three or more pieces of plate-like alumina into contact with crystal planes at a plurality of locations at the same time as formation, intersecting and fixing. According to this fixing, the card-house structure is not easily broken (not crushed) due to external stress such as pressure, and a fixed state structure is obtained. For example, flux conditions in which plate-like alumina is formed affect the crushing strength of the obtained alumina particles having a card-house structure and the like.

When the amount of the molybdenum compound is smaller, fixing of three or more pieces of plate-like alumina into aluminum compound particles becomes faster, and a frequency thereof also increases. Therefore, a strong card-house structure having high crushing strength can be obtained.

According to knowledge found by the inventors focusing on the flux method, specifically, for example, preferably, 1) as a raw material aluminum compound, an aluminum compound corresponding to the particle size of alumina particles to be obtained having an average particle size of 2 m or more, and particularly 4 µm or more is used; 2) an amount of the molybdenum compound as a flux agent is 0.005 to 0.236 mol as a molybdenum metal of the molybdenum compound with respect to 1 mol of an aluminum metal of the aluminum compound; and 3) an amount of the silicon compound as a shape-controlling agent is 0.003 to 0.09 mol as a silicon metal of the silicon compound with respect to 1 mol of an aluminum metal of the aluminum compound, so that alumina particles having a card-house structure having higher fluidity and higher crushing strength are obtained.

In the flux method, in a method of producing alumina particles in which a molybdenum compound and a potassium compound are used as a flux agent, a silicon or a silicon compound is used together as a shape-controlling agent, and these are mixed together with an aluminum compound and fired, preferably 1) a raw material aluminum compound having a specific average particle size is used; 2) the amount of the molybdenum compound and the potassium compound used is limited to be within a specific range; and 3) the amount of silicon or a silicon compound used is limited to be within a specific range, so that alumina particles having a card-house structure formed of three or more pieces of plate-like alumina in a specific average particle size range and in which the pieces of plate-like alumina are fixed to each other can be selectively generated.

In addition, the average particle size and shape of the alumina particles having a card-house structure can be arbitrarily adjusted according to a grinding step and a classification step to be described below.

(Molybdenum Compound)

As will be described below, the molybdenum compound functions as a flux agent for a crystal growth of alumina. The molybdenum compound is not particularly limited, and examples thereof include molybdenum oxide and a compound containing acid radical anions ($MoO_x^{n-}$) formed by a bond of a molybdenum metal and oxygen.

The compound containing acid radical anions ($MoO_x^{n-}$) is not particularly limited, and examples thereof include molybdate, sodium molybdate, potassium molybdate, lithium molybdate, $H_3PMo_{12}O_{40}$, $H_3SiMo_{12}O_{40}$, $NH_4Mo_7O_{12}$, and molybdenum disulfide.

The molybdenum compound can contain sodium or silicon. In this case, the molybdenum compound containing sodium or silicon serves as both a flux agent and a shape-controlling agent.

Among the above molybdenum compounds, molybdenum oxide is preferably used in consideration of costs. In addition, one of the above molybdenum compounds may be used alone or a combination of two or more types thereof may be used.

In addition, since potassium molybdate ($K_2Mo_nO_{3n+1}$, n=1 to 3) contains potassium, it also has a function as a potassium compound to be described below. In the production method according to the embodiment, using potassium molybdate as a flux agent is synonymous with using a molybdenum compound and a potassium compound as a flux agent.

The amount of the molybdenum compound used is not particularly limited, and is, as a molybdenum metal of the molybdenum compound, preferably 0.005 to 0.236 mol, more preferably 0.007 to 0.09 mol, and most preferably 0.01 to 0.04 mol with respect to 1 mol of an aluminum metal of the aluminum compound. When the amount of the molybdenum compound used is within the above range, this is preferable since alumina particles having a card-house structure formed of plate-like alumina having a high aspect ratio and excellent dispersibility are easily obtained. In addition, if the flux method is used, when a molybdenum compound is used as a flux agent, since molybdenum is contained in the alumina particles, using this as evidence, it is possible to determine a production method by which unknown alumina particles are produced.

When a molybdenum compound and a potassium compound are used as a flux agent, the amount of the molybdenum compound used is not particularly limited. The molar ratio of molybdenum element in the molybdenum compound to aluminum element in the aluminum compound (molybdenum element/aluminum element) is preferably 0.01 to 3.0, more preferably 0.1 to 1.0, and in order to improve productivity and for crystal growth to proceed appropriately, most preferably 0.30 to 0.70. When the amount of the molybdenum compound used is within the above range, this is preferable since alumina particles having a card-house structure formed of plate-like alumina having a high aspect ratio and excellent dispersibility are easily obtained.

(Potassium Compound)

When a molybdenum compound and a potassium compound are used as a flux agent, the potassium compound is not particularly limited, and potassium chloride, potassium chlorite, potassium chlorate, potassium sulfate, potassium hydrogen sulfate, potassium sulfite, potassium hydrogen sulfite, potassium nitrate, potassium carbonate, potassium hydrogen carbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, potassium tungstate, and the like are exemplified. At this time, the potassium compounds include an isomer in the same manner as the molybdenum compound. Among these, potassium carbonate, potassium hydrogen carbonate, potassium oxide, potassium hydroxide, potassium chloride, potassium sulfate, and potassium molybdate are preferably used; and potassium carbonate, potassium hydrogen carbonate, potassium chloride, potassium sulfate, and potassium molybdate are more preferably used.

Here, the above potassium compounds may be used alone or a combination of two or more types thereof may be used.

In addition, as described above, since potassium molybdate contains molybdenum, it also has a function as the above molybdenum compound. In the production method according to the embodiment, using potassium molybdate as a flux agent is synonymous with using a molybdenum compound and a potassium compound as a flux agent.

As a potassium compound that is used when a raw material is prepared or produced in a reaction in a temperature raising process during firing, a water-soluble potassium compound, for example, potassium molybdate, can be easily collected by washing after firing without being vaporized even in a firing temperature range. Therefore, an amount of the molybdenum compound released to the outside of the firing furnace is also reduced, and production costs can be significantly reduced.

When the molybdenum compound and the potassium compound are used as a flux agent, the molar ratio of molybdenum element of the molybdenum compound to potassium element of the potassium compound (molybdenum element/potassium element) is preferably 5 or less, more preferably 0.01 to 3, and most preferably 0.5 to 1.5 because production costs can be further reduced. When the molar ratio (molybdenum element/potassium element) is within the above range, this is preferable since plate-like alumina particles having a large particle size can be obtained.

(Silicon or a Silicon Compound)

In the method of producing alumina particles, when silicon or a silicon compound is used as a shape-controlling agent, this is preferable since the fluidity of the resulting alumina particles and the like are more favorable. Silicon or a silicon compound has an important role in plate-like crystal growth of alumina by firing an alumina compound in the presence of a molybdenum compound.

Since silicon in the silicon compound is selectively adsorbed on the [113] plane of an α crystal of alumina, selective adsorption of molybdenum oxide as a flux agent on the [113] plane is minimized. And as a result, a plate-like form having a crystal structure of the most thermodynamically stable closed-packed hexagonal lattice with the (001) plane or the (006) plane developed can be formed. Therefore, when the amount of silicon increases, crystal formation of the (001) plane or the (006) plane is presumed to be promoted, and a plate-like alumina with a thin thickness is obtained.

In addition, since there is a sufficient amount of silicon that can be selectively adsorbed on the [113] plane of the a crystal of alumina, selective adsorption of molybdenum oxide on the [113] plane is minimized. And as a result, a plate-like form having a crystal structure of the most thermodynamically stable closed-packed hexagonal lattice with the (001) plane or the (006) plane developed can be formed. Therefore, it is speculated that, when the amount of silicon increases, respective plate-like alumina intersections also have a crystal structure of the most thermodynamically stable closed-packed hexagonal lattice as well as other parts and can be firmly fixed. That is, when the amount of silicon increases appropriately, the crushing strength of the obtained alumina particles having a card-house structure is improved.

The type of silicon or a silicon compound is not particularly limited, and not only silicon atoms but also any known silicon compound can be used. Specific examples thereof include metal silicon (silicon atom); artificially synthesized silicon compounds such as organosilane compounds, silicone resins, silica ($SiO_2$) fine particles, silica gel, mesoporous silica, SiC, and mullite; and natural silicon compounds such as biosilica. Among these, when organosilane compounds, silicone resins, or silica fine particles are used, this is preferable since compositing and mixing with an aluminum compound can be more uniformly performed. Here, one or two or more types of the above components may be used may be used.

When the silicon compound is an organic silicon compound, the organic component is burned off by firing and becomes silicon atoms or an inorganic silicon compound, and are contained in alumina particles. When the silicon compound is an inorganic silicon compound, by firing, silicon atoms or an inorganic silicon compound that do not decompose at a high temperature during firing is directly locally incorporated into the surface of the plate-like alumina. In view of this, it is preferable to use silicon atoms and/or inorganic silicon compounds which can increase the amount of silicon atoms in a smaller amount of inorganic silicon compounds than organic silicon compound if the molecular weight is the same.

The shape of silicon or a silicon compound is not particularly limited, and for example, any of a spherical shape, an amorphous shape, a structure having a high aspect ratio (a wire, a fiber, a ribbon, a tube, and the like), and a sheet can be appropriately used.

The amount of silicon or a silicon compound used is not particularly limited, and it is preferable to use a sufficient amount that can be selectively adsorbed on the [113] plane of the a crystal of alumina, and it is preferably 0.003 to 0.09 mol, more preferably 0.005 to 0.04 mol, and most preferably 0.007 to 0.03 mol with respect to 1 mol of an aluminum metal of an aluminum compound serving as a raw material, as a silicon metal of the silicon compound.

When a molybdenum compound and a potassium compound are used as flux agent, an amount of the silicon compound added with respect to the aluminum compound is preferably 0.01 to 10 mass %, more preferably 0.03 to 7 mass %, and most preferably 0.03 to 3 mass %.

When the amount of the silicon compound used is within the above range, this is preferable since the aspect ratio of the plate-like alumina is high and alumina particles having excellent dispersibility are easily obtained. When the amount of the silicon compound is insufficient, adsorption of molybdenum oxide as a flux agent on the [113] plane cannot be sufficiently minimized in many cases, and the plate-like alumina tends to have a small aspect ratio and the plate-like alumina tends to become non-uniform. In addition, when the amount of the silicon compound is insufficient, this is not preferable since alumina particles to be produced tend to be a polyhedral alumina having no card-house structure. In addition, when the amount of the silicon compound is too large, this is not preferable since excess silicon alone becomes an oxide and different types of crystals other than alumina such as $3Al_2O_3 \cdot 2SiO_2$ are included.

In addition, as described above, silicon or a silicon compound may be optionally added to the aluminum compound but it may be contained as impurities in the aluminum compound.

In the above production method, a method of adding silicon or a silicon compound is not particularly limited, and examples of the method may include a dry blend method of directly adding and mixing it as a powder; a method of mixing using a mixer; and a method of adding silicon or a silicon compound that is dispersed in a solvent, a monomer, or the like in advance.

Alumina particles having a card-house structure in which silicon atoms and/or inorganic silicon compounds are unevenly distributed on the surface of the plate-like alumina and in the vicinity thereof through a step of firing an aluminum compound in the presence of a molybdenum compound and a silicon compound can be easily obtained.

According to findings that the inventors discovered, the use of a silicon compound during preparation is an important factor for easily obtaining a card-house structure. And it is also an important factor that since the presence of silicon atoms and/or inorganic silicon compounds unevenly distributed on the surface of the alumina particles produced by firing and in the vicinity thereof causes a great change in the surface state of alumina, which originally lacks active points, not only excellent characteristics of alumina is allowed to be maximized by itself, but also a superior surface state of integration with a surface treatment agent is allowed to be imparted due to the reaction with its active point as a starting point.

(Germanium Compound)

A germanium compound may be used as a shape-controlling agent in combination with silicon or a silicon compound or in place of silicon or a silicon compound. The germanium compound has an important role in plate-like crystal growth of alumina by firing an alumina compound in the presence of a molybdenum compound.

The raw material germanium compound used as a shape-controlling agent is not particularly limited, and known compounds can be used. Specific examples of raw material germanium compounds include germanium metal, germanium dioxide, germanium monoxide, germanium tetrachloride, and organic germanium compounds having a Ge—C bond. Here, the raw material germanium compounds may be used alone or a combination of two or more types thereof may be used. In addition, as long as effects of the present invention are not impaired, other shape-controlling agents may be used together.

The shape of the raw material germanium compound is not particularly limited, and for example, any of a spherical shape, an amorphous shape, a structure having a high aspect ratio (a wire, a fiber, a ribbon, a tube, and the like), and a sheet can be appropriately used.

The amount of the germanium compound used is not particularly limited, and is, as a germanium metal of the germanium compound, preferably 0.002 to 0.09 mol, more preferably 0.004 to 0.04 mol, and most preferably 0.005 to 0.03 mol with respect to 1 mol of an aluminum metal of the aluminum compound as a raw material.

(Other Shape-Controlling Agent)

In the alumina particles, as long as at least one shape-controlling agent selected from among silicon, a silicon compound and a germanium compound does not inhibit formation of the plate-like alumina, as necessary, in order to adjust fluidity, dispersibility, mechanical strength, and the average particle size and the aspect ratio of the plate-like alumina, a shape-controlling agent other than the above may be used. Similarly, the other shape-controlling agent contributes to plate-like crystal growth of alumina by firing an alumina compound in the presence of a molybdenum compound.

The form in which other shape-controlling agents are present is not particularly limited as long as it can be in contact with an aluminum compound. For example, a physical mixture including a shape-controlling agent and an aluminum compound, a composite in which a shape-controlling agent is uniformly or locally present on the surface of or inside an aluminum compound, and the like can be appropriately used.

In addition, the other shape-controlling agent may be optionally added to an aluminum compound but it may be contained as impurities in the aluminum compound.

A method of adding other shape-controlling agent is not particularly limited, and examples of the method may include a dry blend method of directly adding and mixing it as a powder; a method of mixing using a mixer, and a method of adding silicon or a silicon compound that is dispersed in a solvent, a monomer, or the like in advance.

Like at least one shape-controlling agent selected from among silicon, a silicon compound and a germanium compound, the type of the other shape-controlling agent is not particularly limited as long as, in the presence of a molybdenum compound, during firing at a high temperature, selective adsorption of molybdenum oxide on the [113] plane of α-alumina can be minimized and a plate-like form can be formed. A metal compound excluding a molybdenum compound and an aluminum compound is preferably used in order to obtain a higher aspect ratio of the plate-like alumina, superior fluidity and dispersibility of alumina particles, and superior productivity. In addition, sodium atoms and/or sodium compounds are more preferably used.

Sodium atoms and/or sodium compounds are not particularly limited, and known compounds can be used. Specific examples thereof include sodium carbonate, sodium molybdenum, sodium oxide, sodium sulfate, sodium hydroxide, sodium nitrate, sodium chloride, metallic sodium, and the like. Among these, in consideration of industrial availability and ease of handling, sodium carbonate, sodium molybdate, sodium oxide, or sodium sulfate is preferably used. Here, sodium or a compound containing sodium atoms may be used alone or a combination of two or more types thereof may be used.

The shape of the sodium atom and/or sodium compound is not particularly limited, and for example, any of a spherical shape, an amorphous shape, a structure having a high aspect ratio (a wire, a fiber, a ribbon, a tube, and the like), and a sheet can be appropriately used.

The amount of sodium atoms and/or sodium compounds used is not particularly limited, and is, as a sodium metal, preferably 0.0001 to 2 mol and more preferably 0.001 to 1 mol with respect to 1 mol of an aluminum metal of the aluminum compound. When the amount of sodium atoms and/or sodium compounds used is within the above range, this is preferable because alumina particles having a high aspect ratio and excellent dispersibility are easily obtained.

(Metal Compound)

As will be described below, the metal compound has a function of promoting crystal growth of alumina. The metal compound can be used during firing as desired. Here, since the metal compound is used for promoting crystal growth of α-alumina, the metal compound is not an essential constitution for producing the composite particles according to the present invention.

The metal compound is not particularly limited, and preferably includes at least one selected from the group consisting of Group II metal compounds and Group III metal compounds.

Examples of Group II metal compounds include magnesium compounds, calcium compounds, strontium compounds, and barium compounds.

Examples of Group III metal compounds include scandium compounds, yttrium compounds, lanthanum compounds, and cerium compounds.

Here, the above metal compounds refer to oxides, hydroxides, carbonates, and chlorides of metal elements. For example, in the case of an yttrium compound, yttrium oxide ($Y_2O_3$), yttrium hydroxide, and carbonated yttrium may be exemplified. Among these, the metal compound is preferably an oxide of a metal element. Here, such a metal compound includes an isomer.

Among these, metal compounds of period 3 elements, metal compounds of period 4 elements, metal compounds of period 5 elements, or metal compounds of period 6 elements are preferable, metal compounds of period 4 elements or metal compounds of period 5 elements are more preferable, and metal compounds of period 5 elements are most preferable. Specifically, a magnesium compound, a calcium compound, an yttrium compound, or a lanthanum compound is preferably used, a magnesium compound, a calcium compound, or an yttrium compound is more preferably used, and an yttrium compound is particularly preferably used.

An amount of the metal compound added with respect to the value in terms of mass of aluminum atoms in the aluminum compound is preferably 0.02 to 20 mass % and more preferably 0.1 to 20 mass %. When an amount of the metal compound added is 0.02 mass % or more, this is preferable since crystal growth of α-alumina containing molybdenum can proceed appropriately. On the other hand, when an amount of the metal compound added is 20 mass % or less, this is preferable since it is possible to obtain alumina particles having a small amount of impurities derived from the metal compound.

(Yttrium)

When the aluminum compound is fired in the presence of an yttrium compound as a metal compound, in this firing step, crystal growth proceeds more appropriately, and α-alumina and a water-soluble yttrium compound are produced. In this case, since the water-soluble yttrium compound is likely to be localized on the surface of α-alumina as plate-like alumina particles, as necessary, washing with water, alkaline water, a liquid in which these are warmed, or the like is performed, and thus the yttrium compound can be removed from the alumina particles.

When a molybdenum compound is used as a flux agent, amounts of the aluminum compound, molybdenum compound, and shape-controlling agent used are not particularly limited. When a compound containing molybdenum element is converted into an oxide as molybdenum trioxide ($MoO_3$), and a total amount of raw materials in terms of oxide is set as 100 mass %, the following 1-1) or 1-2) mixture may be fired.

1-1) A mixture in which
80 mass % or more of aluminum compound containing aluminum element in terms of $Al_2O_3$,
1.0 mass % or more of a molybdenum compound in terms of $MoO_3$, and
0.4 mass % or more of silicon or a silicon compound containing silicon element in terms of $SiO_2$
are mixed.

1-2) A mixture in which
80 mass % or more of an aluminum compound containing aluminum element in terms of $Al_2O_3$,
1.0 mass % or more of a molybdenum compound in terms of $MoO_3$, and
0.4 mass % or more of a germanium compound in terms of $GeO_2$
are mixed.

When the above mixture 1-1) or 1-2) is used, alumina particles having a card-house structure can be produced with higher efficiency Regarding a common point of a phenomenon that occurs when the above 1-1) or 1-2) mixture is fired, it is thought that crystal of at least a part of the original form of the aluminum compound used as a raw material grows in an initial stage of crystal growth. Therefore, it is thought that, each part of the raw material aluminum compound is used as each starting point, and each plate-like alumina is formed at such a part, and as a result, a card-house structure which is formed of three or more pieces of plate-like alumina and in which the pieces of plate-like alumina are fixed to each other is formed.

In the above 1-1), it is thought that, when 0.4 mass % or more of silicon or a silicon compound containing silicon element in terms of $SiO_2$ is used and a relatively large proportion thereof is used, collapse of the shape of the raw material aluminum compound is prevented and the shape of the aluminum compound used as a raw material can be kept.

In the above 1-2), it is thought that, when 0.4 mass % or more of germanium compound in terms of $GeO_2$ is used and a relatively large proportion thereof is used, collapse of the shape of the raw material aluminum compound is prevented and the shape of the aluminum compound used as a raw material can be kept.

In the above 1-1), when a total amount of raw materials in terms of oxide is set as 100 mass %, amounts of raw materials in the mixture added are preferably as follows so that alumina particles having a card-house structure and exhibiting excellent fluidity can be produced more easily.

In the above 1-1), when a total amount of raw materials in terms of oxide is set as 100 mass %, the amount of the aluminum compound added in terms of $Al_2O_3$ is preferably 80 mass % or more, more preferably 85 mass % or more and 99 mass % or less, and most preferably 85 mass % or more and 95 mass % or less.

In the above 1-1), when a total amount of raw materials in terms of oxide is set as 100 mass %, the amount of the molybdenum compound in terms of $MoO_3$ is preferably 1.0 mass % or more, more preferably 2.0 mass % or more and 15 mass % or less, and most preferably 4.0 mass % or more and 10 mass % or less.

In the above 1-1), when a total amount of raw materials in terms of oxide is set as 100 mass %, the amount of silicon or a silicon compound containing silicon element added in terms of $SiO_2$ is preferably 0.4 mass % or more, more preferably 0.4 mass % or more and 5.0 mass % or less, and most preferably 0.5 mass % or more and 2.0 mass % or less.

In the above 1-2), when a total amount of raw materials in terms of oxide is set as 100 mass %, amounts of raw materials in the mixture added are preferably as follows so that alumina particles having a card-house structure and exhibiting excellent fluidity can be produced more easily.

In the above 1-2), when a total amount of raw materials in terms of oxide is set as 100 mass %, the amount of the aluminum compound added in terms of $Al_2O_3$ is preferably 80 mass % or more, more preferably 85 mass % or more and 99 mass % or less, and most preferably 85 mass % or more and 95 mass % or less.

In the above 1-2), when a total amount of raw materials in terms of oxide is set as 100 mass %, the amount of the molybdenum compound added in terms of $MoO_3$ is preferably 1.0 mass % or more, more preferably 2.0 mass % or more and 15 mass % or less, and most preferably 4.0 mass % or more and 10 mass % or less.

In the above 1-2), when a total amount of raw materials in terms of oxide is set as 100 mass %, the amount of the germanium compound added in terms of $GeO_2$ is preferably 0.4 mass % or more, more preferably 0.4 mass % or more and 5.0 mass % or less, and most preferably 0.5 mass % or more and 2.0 mass % or less.

When a molybdenum compound and a potassium compound are used as a flux agent, the amounts of the aluminum compound, molybdenum compound, potassium compound, and shape-controlling agent used are not particularly limited. When a compound containing molybdenum element and potassium element or a molybdenum compound containing molybdenum element and a potassium compound containing potassium element are converted into an oxide as potassium molybdate ($Mo_2K_2O_7$) and the total amount of raw materials in terms of oxide is set as 100 mass %, the following 2-1) or 2-2) mixture may be fired.

2-1) A mixture in which
  10 mass % or more of an aluminum compound containing aluminum element in terms of $Al_2O_3$,
  50 mass % or more of the molybdenum compound and the potassium compound in terms of $Mo_2K_2O_7$, and
  0.3 mass % or more of silicon or a silicon compound containing silicon element in terms of $SiO_2$
  are mixed.

2-2) A mixture in which
  50 mass % or more of an aluminum compound containing aluminum element in terms of $Al_2O_3$,
  30 mass % or less of the molybdenum compound and the potassium compound in terms of $Mo_2K_2O_7$, and
  0.01 mass % or more of silicon or a silicon compound containing silicon element in terms of $SiO_2$
  are mixed.

When the above mixture 2-1) or 2-2) is used, alumina particles having a card-house structure can be produced with higher efficiency.

Regarding a common point of a phenomenon that occurs when the above 2-1) or 2-2) mixture is fired, it is thought that crystal of at least a part of the original form of the aluminum compound used as a raw material grows in an initial stage of crystal growth. Therefore, it is thought that, each part of the raw material aluminum compound is used as each starting point, and each plate-like alumina is formed at each starting point, and as a result, a card-house structure which is formed of three or more pieces of plate-like alumina and in which the pieces of plate-like alumina are fixed to each other is formed.

In the above 2-1), it is thought that, when 0.3 mass % or more of silicon or a silicon compound containing silicon element in terms of $SiO_2$ is used and a relatively large proportion thereof is used, collapse of the shape of the raw material aluminum compound is prevented and the shape of the aluminum compound used as a raw material can be kept.

In the above 2-2), it is thought that, when 30 mass % or less of the molybdenum compound and the potassium compound in terms of $Mo_2K_2O_7$ is used and a relatively small proportion thereof is used, collapse of the shape of the raw material aluminum compound is prevented and the shape of the aluminum compound used as a raw material can be kept.

In the above 2-1), when a total amount of raw materials in terms of oxide is set as 100 mass %, amounts of raw materials in the mixture added are preferably as follows so that alumina particles having a card-house structure and exhibiting excellent fluidity can be produced more easily.

In the above 2-1), when a total amount of raw materials in terms of oxide is set as 100 mass %, the amount of the aluminum compound added in terms of $Al_2O_3$ is preferably 10 mass % or more, more preferably 10 mass % or more and 70 mass % or less, most preferably 20 mass % or more and 45 mass % or less, and particularly preferably 25 mass % or more and 40 mass % or less.

In the above 2-1), when a total amount of raw materials in terms of oxide is set as 100 mass %, the amount of the molybdenum compound and potassium compound added in terms of $Mo_2K_2O_7$ is preferably 50 mass % or more, more preferably 50 mass % or more and 80 mass % or less, still more preferably 55 mass % or more and 75 mass % or less, and most preferably 60 mass % or more and 70 mass % or less.

In the above 2-1), when a total amount of raw materials in terms of oxide is set as 100 mass %, the amount of silicon or a silicon compound containing silicon element added in terms of $SiO_2$ is preferably 0.3 mass % or more, more preferably 0.3 mass % or more and 5 mass % or less, and most preferably 0.4 mass % or more and 3 mass % or less.

In the above 2-2), when a total amount of raw materials in terms of oxide is set as 100 mass %, amounts of raw materials in the mixture added are preferably as follows so that alumina particles having a card-house structure and exhibiting excellent fluidity can be produced more easily.

In the above 2-2), when a total amount of raw materials in terms of oxide is set as 100 mass %, the amount of the aluminum compound added in terms of $Al_2O_3$ is preferably 50 mass % or more, more preferably 50 mass % or more and 96 mass % or less, most preferably 60 mass % or more and 95 mass % or less, and particularly preferably 70 mass % or more and 90 mass % or less.

In the above 2-2), when a total amount of raw materials in terms of oxide is set as 100 mass %, the amount of the molybdenum compound and potassium compound added in terms of $Mo_2K_2O_7$ is preferably 30 mass % or less, more preferably 2 mass % or more and 30 mass % or less, most preferably 3 mass % or more and 25 mass % or less, and particularly preferably 4 mass % or more and 10 mass % or less.

In the above 2-2), when a total amount of raw materials in terms of oxide is set as 100 mass %, the amount of silicon or a silicon compound containing silicon element added in terms of $SiO_2$ is preferably 0.01 mass % or more, more preferably 0.01 mass % or more and 5 mass % or less, most preferably 0.05 mass % or more and 3 mass % or less, and particularly preferably 0.15 mass % or more and 3 mass % or less.

When the mixture further contains the above yttrium compound, an amount of the yttrium compound used is not particularly limited. Here, when a total amount of raw materials in terms of oxide is set as 100 mass %, in terms of $Y_2O_3$, preferably 5 mass % or less of the yttrium compound can be added. When the total amount of raw materials in terms of oxide is set as 100 mass %, in terms of $Y_2O_3$, more preferably 0.01 mass % or more and 3 mass % or less of the yttrium compound can be added. In order for crystal growth to proceed more appropriately, when a total amount of raw materials in terms of oxide is set as 100 mass %, in terms of $Y_2O_3$, more preferably, 0.1 mass % or more and 1 mass % or less of the yttrium compound can be added.

When a molybdenum compound and a potassium compound are used as a flux agent, through a step of firing an aluminum compound in the presence of the molybdenum compound and the potassium compound, and at least one shape-controlling agent selected from among silicon, a silicon compound and a germanium compound, alumina particles having a card-house structure in which silicon and/or germanium is unevenly distributed on the surface of the plate-like alumina and in the vicinity thereof can be easily obtained. According to findings that the inventors discovered, the use of at least one shape-controlling agent selected from among silicon, a silicon compound and a germanium compound during preparation is an important factor for easily obtaining a card-house structure and it is also an important factor that since the presence of silicon and/or germanium unevenly distributed on the surface of the alumina particles produced by firing and in the vicinity thereof causes a great change in the surface state of alumina, which originally lacks active points, not only excellent characteristics of alumina by itself is allowed to be maximized but also a superior surface state by integration with a surface treatment agent is allowed to be imparted due to the reaction with its active point as a starting point.

[Firing Step]

The firing step is appropriately a step of firing an aluminum compound in the presence of a molybdenum compound, at least one shape-controlling agent selected from among silicon, a silicon compound and a germanium compound, and as necessary, other shape-controlling agents. The firing step may be a step of firing the mixture obtained in the mixing step.

Alumina particles can be obtained by, for example, firing an aluminum compound in the presence of a molybdenum compound and a shape-controlling agent. As described above, this production method is called a flux method. Based on the above flux method, formation of plate-like alumina and formation of a card-house structure according to fixing of three or more pieces of the plate-like alumina are assumed to proceed in parallel.

The flux method is classified into a solution method. In more detail, the flux method is a crystal growth method in which the fact that a crystal-flux binary phase diagram is a eutectic-type phase diagram is used. The mechanism of the flux method is conjectured to be as described below. That is, when a mixture of a solute and a flux is heated, the solute and the flux become a liquid phase. At this time, the flux is a fusing agent, in other words, the solute-flux binary phase diagram is a eutectic-type phase diagram, and thus the solute is fused at a temperature lower than the melting temperature of the solute and configures the liquid phase. When the flux is vaporized in this state, the concentration of the flux decreases, in other words, the effect of the flux for lowering the melting temperature of the solute becomes weak, and the vaporization of the flux serves as a driving force, whereby the crystal growth of the solute is caused (flux vaporization method). The solute and the flux are also capable of causing the crystal growth of the solute by cooling the liquid phase (slow cooling method).

The flux method has advantages of causing crystal growth at a temperature far lower than the melting temperature, precisely controlling the crystal structure, and forming a polyhedral crystal having an euhedral face.

Regarding the manufacturing of an α-alumina particle by the flux method in which the molybdenum compound is used as the flux, the mechanism is not clear, but is conjectured, for example, as described below. That is, when the aluminum compound is fired in the presence of the molybdenum compound, aluminum molybdate is first formed. At this time, as is clear from the above description, the aluminum molybdate grows an alumina crystal at a temperature lower than the melting temperature of alumina. In addition, the crystal growth is accelerated through, for example, the decomposition of the aluminum molybdate, the vaporization of the flux, and the like, whereby an alumina particle can be obtained. That is, the molybdenum compound functions as the flux, and the alumina particle is produced via an intermediate of aluminum molybdate.

Here, in the above flux method, when a potassium compound and a shape-controlling agent are used together, it is possible to produce alumina particles having a card-house structure formed of three or more pieces of plate-like alumina with high efficiency. More specifically, when a molybdenum compound and a potassium compound are used together, first, the molybdenum compound reacts with the potassium compound to form potassium molybdate. At the same time, the molybdenum compound reacts with the aluminum compound to form aluminum molybdate. Then, for example, in the presence of potassium molybdate, aluminum molybdate decomposes, and in the presence of the shape-controlling agent, crystal growth occurs, and thus alumina particles having a card-house structure formed of three or more pieces of plate-like alumina can be obtained. That is, when alumina particles are produced via aluminum molybdate as an intermediate, if there is potassium molybdate, alumina particles having a card-house structure formed of three or more pieces of plate-like alumina can be obtained.

As described above, potassium or a potassium compound as potassium molybdate has a role as a flux agent.

Here, the above mechanism is only a speculation, and even if effects of the present invention are obtained through a mechanism different from the above mechanism, the mechanism is included in the technical scope of the present invention.

The above configuration of potassium molybdate is not particularly limited, and generally contains molybdenum atoms, potassium atoms, and oxygen atoms. The structural formula is preferably represented by $K_2Mo_nO_{3n+1}$. In this case, n is not particularly limited, but is preferably in a range of 1 to 3 because promotion of alumina particle growth effectively functions. Here, potassium molybdate may contain other atoms, and examples of other atoms include sodium, magnesium, and silicon.

In one embodiment of the present invention, the above firing may be performed in the presence of a metal compound. That is, in the firing, the above metal compound may be used in combination with a molybdenum compound and a potassium compound. Therefore, alumina particles having superior fluidity can be produced. The mechanism is not entirely clear, but it is speculated, for example, as follows. That is, it is thought that, when there is a metal compound during crystal growth of alumina particles, excessive formation of alumina crystal nuclei is prevented or minimized and/or diffusion of an aluminum compound necessary for crystal growth of alumina is promoted. In other words, a function of preventing excessive generation of crystal nuclei and/or a function of increasing a diffusion rate of an aluminum compound is exhibited. And as a result, a direction of crystal growth of alumina can be more precisely controlled; shape control such as reflecting the shape of the precursor becomes easy, and alumina particles having higher fluidity are obtained. Here, the above mechanism is only a speculation, and even if effects of the present invention are obtained through a mechanism different from the above mechanism, the mechanism is included in the technical scope of the present invention.

A method for the firing is not particularly limited, and the firing can be performed by a well-known conventional method. When the firing temperature exceeds 700° C., the aluminum compound and the molybdenum compound react with each other, thereby forming aluminum molybdate. Further, when the firing temperature reaches 900° C. or higher, the aluminum molybdate is decomposed, and the plate-like alumina is formed by the action of the shape-controlling agent. In addition, it is considered that, in the plate-like alumina, when the aluminum molybdate is decomposed to become alumina and molybdenum oxide, the molybdenum compound is incorporated into an aluminum oxide particle.

In addition, during the firing, the states of the aluminum compound, the shape-controlling agent, and the molybdenum compound are not particularly limited, and the molybdenum compound and the shape-controlling agent need to be present in the same space so that the molybdenum compound and the shape-controlling agent are capable of acting on the aluminum compound. Specifically, the molybdenum compound, the shape-controlling agent, and the aluminum compound may be mixed together by simple mixing of mixing the powders of the molybdenum compound, the shape-controlling agent, and the aluminum compound, mechanical mixing by a grinder, a mixer or the like, or mixing by a mortar or the like, and the molybdenum compound, the shape-controlling agent, and the aluminum compound may be mixed together in a dry state or a wet state.

A firing temperature condition is not particularly limited, and is appropriately, determined according to the average particle size, fluidity, dispersibility, and aspect ratio of plate-like alumina of desired alumina particles. Generally, the maximum temperature of the firing temperature may be 900° C. or higher which is a decomposition temperature of aluminum molybdate ($Al_2(MoO_4)_3$).

Generally, in order to control the shape of α-alumina obtained after firing, it is necessary to perform firing at a high temperature of 2,000° C. or higher close to the melting point of α-alumina, but there is a big challenge for industrial applications in consideration of the burden on the firing furnace and fuel costs.

The preferred production method of alumina particles as described above can also be performed at a high temperature exceeding 2,000° C. However, alumina particles made of a plate-like alumina having a high α crystallization rate and a high aspect ratio can be formed also at a temperature much lower than the melting point of α-alumina of 1,600° C. or lower.

According to the preferred production method as described above, even if the maximum firing temperature condition is 900° C. to 1,600° C., it is possible to simply and efficiently form alumina particles having a high aspect ratio of plate-like alumina and an α crystallization rate of 90% or more at low costs, and firing at a maximum temperature of 920 to 1,500° C. is more preferable, and firing at a maximum temperature in a range of 950 to 1,400° C. is most preferable.

When the firing temperature is higher, a crystallization at the intersections of the plate-like alumina is improved as in other parts, and alumina particles having a card-house structure with excellent mechanical strength are obtained.

Regarding the firing time, firing is performed for a temperature raising time in a range of 15 minutes to 10 hours to reach a predetermined maximum temperature, and preferably a holding time at the firing maximum temperature is in a range of 5 minutes to 30 hours. In order to efficiently form a plate-like alumina, a firing holding time of about 10 minutes to 15 hours is more preferable.

When a holding time at the firing maximum temperature is longer, a crystallization at the intersections of the plate-like alumina is improved as in other parts, and alumina particles having a card-house structure with excellent crushing strength are obtained.

The firing atmosphere is not particularly limited as long as effects of the present invention are obtained. For example, an oxygen-containing atmosphere such as air or oxygen, or an inert atmosphere such as nitrogen, or argon is preferable, and an air atmosphere is more preferable in consideration of costs.

An apparatus for firing is not always limited, and a so-called firing furnace can be used. The firing furnace is preferably configured of a material that does not react with sublimated molybdenum oxide, and a highly airtight firing furnace is preferably used so as to more efficiently use molybdenum oxide. Examples of firing furnaces used in this case include a tunnel furnace, a roller-hearth furnace, a rotary kiln, and a muffle furnace.

In the above preferred production method, alumina particles having a card-house structure are selectively obtained, and a powder containing the alumina particles in a proportion of 60% or more based on the total number thereof is easily obtained. Preferably, more appropriate conditions are selected in the production method, and among the alumina particles, three or more pieces of plate-like alumina intersect and adhere at two or more locations, and thus a powder containing the alumina particles having a card-house structure in which planar directions of flat planes intersecting are randomly arranged in a proportion of 80% or more based on the total number thereof can be more easily obtained.

[Cooling Step]

When a molybdenum compound and a potassium compound are used as a flux agent, the method of producing alumina particles may include a cooling step. The cooling step is a step of cooling alumina of which a crystal is grown in the firing step. More specifically, it may be a step of cooling a composition including the alumina obtained in the firing step and a flux agent in a liquid phase.

The cooling rate is not particularly limited, and 1 to 1,000° C./hour is preferable, 5 to 500° C./hour is more preferable, and 50 to 100° C./hour is most preferable. When the cooling rate is 1° C./hour or more, this is preferable since the production time can be shortened. On the other hand, when the cooling rate is 1,000° C./hour or less, this is preferable since the firing container is less likely to break due to heat shock and can be used for a long time.

The cooling method is not particularly limited, and natural cooling or a cooling device may be used.

[Post-Treatment Step]

The method of producing composite particles according to the embodiment may include a post-treatment step. The post-treatment step is a post-treatment step for alumina particles having a card-house structure and is a step of removing the flux agent. The post-treatment step may be performed after the above firing step, may be performed after the above cooling step, or may be performed after the firing step and the cooling step. In addition, as necessary, this step may be repeated twice or more.

Examples of post-treatment methods include washing and a high temperature treatment. These can be performed in combination.

The washing method is not particularly limited, and the flux agent can be removed by washing with water, an ammonia aqueous solution, a sodium hydroxide aqueous solution, or an acidic aqueous solution.

In this case, it is possible to control the amount of molybdenum by appropriately changing the concentration and amount of water, an ammonia aqueous solution, a sodium hydroxide aqueous solution, or an acidic aqueous solution used; a washing part; a washing time; and the like.

In addition, examples of high temperature treatment methods include a method of raising the temperature to a sublimation point or boiling point or higher of the flux.

[Pulverizing Step]

In the fired product, alumina particles adhere to each other and may not have an appropriate particle size range of the present invention. Therefore, the alumina particles may be pulverized as necessary so that they have an appropriate particle size range of the present invention.

A fired product pulverizing method is not particularly limited, and pulverization methods known in the related art using a ball mill, a jaw crusher, a jet mill, a disc mill, a spectromill, a grinder, a mixer mill, and the like can be applied.

[Classification Step]

Preferably, alumina particle is preferably subject to a classification treatment in order to adjust the average particle diameter and improve the fluidity of powder or to suppress an increase in viscosity when formulated into a binder for forming a matrix.

The classification may be any of a wet type and a dry type, and dry-type classification is preferable from the viewpoint of productivity. Examples of the dry-type classification include not only classification by a sieve but also wind power classification in which classification is performed by a difference between the centrifugal force and the fluid drag, and from the viewpoint of classification precision, wind power classification is preferable, and it is possible to perform wind power classification using a classifier such as an air classifier in which the Coanda effect is used, a swirling airflow-type classifier, a forced vortex centrifugal classifier, or a semi-free vortex centrifugal classifier.

The above pulverizing step and classification step can be performed in a required step including before and after an organic compound layer forming step to be described below. According to whether such pulverizing and classification are provided or by selecting conditions therefore, for example, the average particle size of the obtained alumina particles can be adjusted. The average particle size of alumina particles has a close relationship with its angle of repose and when it is not possible to make sufficient adjustment simply by the production method and the production conditions for alumina particles themselves described above, fluidity of alumina particles can be adjusted by changing the average particle size of alumina particles (indirectly changing the angle of repose) according to selection of conditions for classification and the like.

Specifically, for example, when there are no alumina particles having a card-house structure with a desired average particle size, alumina particles having a larger average particle size are classified and thus alumina particles having a card-house structure with a smaller average particle size can be obtained. The obtained alumina particles have superior fluidity in comparison with known alumina particles which have the same average particle sizes as the obtained alumina particles.

[Inorganic Coating Part Forming Step]

Next, an inorganic coating part is formed on the surface of the plate-like alumina constituting the alumina particles having a card-house structure obtained above. In the present embodiment, an inorganic coating part made of an oxide can be formed. A layer forming method is not particularly limited, and examples thereof include a liquid phase method and a gas phase method.

As inorganic chemical species for forming the inorganic coating part, any of those described above can be used. In a preferred embodiment of the present invention, the inorganic species may include a metal oxide. A method of forming metal oxide coating on the surface of the alumina particles may include mixing a liquid medium dispersion of the alumina particles with a metal oxide itself or a dispersion thereof. If necessary, further filtration and drying can be performed. In addition, in order to obtain particularly outstanding properties, such as increasing the interaction between the alumina particles and the metal oxide; obtaining higher coating properties; obtaining a more uniform inorganic coating part; and preventing the obtained inorganic coating part from being peeled from the alumina particles, a method of forming metal oxide coating on the surface of alumina particles may preferably include mixing a solution of a metal inorganic salt which has solubility in a liquid medium and corresponds to a precursor of the metal oxide, with the alumina particles or a liquid medium dispersion thereof; depositing a fine metal inorganic salt of 150 nm or less on the alumina particles after sufficiently contacting a dissolved molecular metal inorganic salt with the alumina particles; and converting the metal inorganic salt to a metal oxide. If necessary, further filtration and drying can be performed. In the step of converting the metal inorganic salt into a metal oxide, if it is not easy to converting the metal inorganic salt into a metal oxide due to a low temperature or pH change, firing can be performed if necessary. By doing so, a strong interaction between the alumina particles and the metal oxide, which cannot be obtained in the simple mixture, can be obtained. And the above-described particularly outstanding properties can be easily obtained. The firing conditions in the step of forming the inorganic coating part may be adopted by appropriately selecting optimum conditions with reference to the conditions for the alumina particles.

Regarding the liquid phase method, for example, a dispersion solution in which alumina particles are dispersed is prepared, and as necessary, the pH of the dispersion solution is adjusted and heating is performed. And then, an aqueous solution containing a metal chloride, for example, titanium chloride, is then added dropwise to the dispersion solution. In this case, it is preferable to maintain pH constant with an alkaline aqueous solution. Then, the dispersion solution is stirred for a predetermined time, and filtration, washing, and drying are performed to obtain a powder. Thus, an inorganic coating part made of an oxide such as titanium oxide is formed on the surface of the plate-like alumina constituting the card-house structure. In addition, an inorganic coating part may be formed of iron oxide or silica as another oxide. Moreover, an inorganic coating part may be formed of a plurality of oxides selected from among titanium oxide, iron oxide and silica.

In this step, an inorganic coating part made of a metal in place of an oxide can be formed. In this case, an inorganic coating part can be formed according to a liquid phase method, a gas phase method, or the like, and an inorganic coating part made of, for example, silver, nickel, copper, gold or platinum, is formed on the surface of the plate-like alumina particles constituting the card-house structure. In addition, an inorganic coating part made of a plurality of metals selected from among silver, nickel, copper, gold, and platinum may be formed.

In addition, in this step, an inorganic coating layer may be formed so that at least a part of the surface of the plate-like alumina is coated. In this case, for example, a layer is formed in a state that particles made of a metal oxide or a metal that adhere to each other.

[Organic Compound Layer Forming Step]

In one embodiment, the method of producing composite particles may further include an organic compound layer forming step in which an organic compound layer is formed on the surface of the inorganic coating part (also called the surface of the composite particles) after the inorganic coating part forming step. The organic compound layer forming step is generally performed after the firing step or the post-treatment step.

A method of forming an organic compound layer on the surface of the composite particles is not particularly limited, and known methods are appropriately used. Examples thereof include a method in which a solution containing an organic compound is brought into contact with composite particles and dried.

Here, examples of organic compounds used for forming the organic compound layer include an organosilane compound.

(Organosilane Compound)

When alumina particles having a card-house structure contain silicon atoms and/or inorganic silicon compounds, the surface modification effect described above can be expected unlike the case in which they do not contain silicon atoms and/or inorganic silicon compounds. Moreover, the alumina particles contain silicon atoms and/or inorganic silicon compounds can also be used to react with an organosilane compound to obtain a reaction product. Compared to alumina particles having a card-house structure containing silicon atoms and/or inorganic silicon compounds, the obtained reaction product between the alumina particles having a card-house contain silicon atoms and/or inorganic silicon compounds and an organosilane compound are preferable because affinity with a matrix can be further improved, based on the reaction between silicon atoms and/or inorganic silicon compounds localized on the surface of the plate-like alumina constituting the alumina particles and the organosilane compound.

Examples of organosilane compounds include alkyltrimethoxysilanes with alkyl groups having 1 to 22 carbon atoms such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane, alkyltrichlorosilanes, 3,3,3-trifluoropropyltrimethoxysilane, tridecafluoro-1,1,2,2-tetrahydrooctyl)trichlorosilanes, phenyltrimethoxysilane, phenyltriethoxysilane, p-chloromethylphenyltrimethoxysilane, p-chloromethylphenyltriethoxysilanes, γ-glycidoxypropyltrimethoxysilane, γ-glycidoxypropyltriethoxysilane, epoxy silanes such as β-(3,4-epoxycyclohexyl)ethyltrimethoxysilane, aminosilanes such as 7-aminopropyltriethoxysilane, N-β (aminoethyl) γ-aminopropyltrimethoxysilane, N-β(aminoethyl)γ-aminopropylmethyldimethoxysilane, γ-aminopropyltrimethoxysilane, and γ-ureidopropyltriethoxysilane, mercaptosilane such as 3-mercaptopropyltrimethoxysilane, vinylsilane such as p-styryltrimethoxysilane, vinyltrichlorosilane, vinyltris(β-methoxyethoxy) silane, vinyltrimethoxysilane, vinyltriethoxysilane, and γ-methacryloxypropyltrimethoxysilane, and additionally include epoxy-based, amino-based, vinyl-based polymer type silanes. Here, the organosilane compounds may be contained alone or two or more thereof may be contained.

The organosilane compound may be covalently linked to at least a part or all of the silicon atoms and/or the inorganic silicon compound on the surface of the plate-like alumina of alumina particles due to the reaction, and not only a part but also the whole of the alumina may be coated with the reaction product. Regarding a method of providing the organosilane compound to the surface of the alumina, adhesion by immersion or chemical vapor deposition (CVD) can be used.

The amount of the organosilane compound used is preferably 20 mass % or less and more preferably 0.01 to 10 mass % based on silicon atoms with respect to the mass of silicon atoms or an inorganic silicon compound contained in the surface of the plate-like alumina of alumina particles. When the amount of the organosilane compound used is 20 mass % or less, this is preferable since physical properties derived from the alumina particles can be easily exhibited.

The reaction between alumina particles containing silicon atoms and/or inorganic silicon compounds and an organosilane compound can be performed according to a known and conventional surface modification method for fillers. For example, a spray method using a fluid nozzle; a dry method using a stirring method, a ball mill, a mixer, which use a shear force; or a wet method using an aqueous or organic solvent, can be used. A treatment using a shear force is desirably performed to the extent that alumina particles used in the embodiment do not break.

The temperature in the system in the dry method or the drying temperature after the treatment in the wet method is appropriately determined in a range in which thermal decomposition does not occur depending on the type of the organosilane compound. For example, when the organosilane compound is treated as described above, a temperature of 80 to 150° C. is desired.

[Post-Treatment Step]

In the method of producing composite particles, as long as the effects are not impaired, an optional step is provided during the production of the composite particles, and a post-treatment step may be added after the inorganic coating layer forming step and the particle size, the shape, and the like may be arbitrarily adjusted. Examples thereof include a granulating step such as rolling granulation and compression granulation, and granulation according to a spray dry production method using a binding agent as a binder, and a commercially available device can be used for easy granulation.

EXAMPLES

While the present invention will be described below in more detail with reference to examples, the present invention is not limited to the following examples.

Example 1

First, card-house type alumina particles serving as a substrate of composite particles were produced. 146.15 g (94.1 mass % in terms of oxide of $Al_2O_3$) of aluminum hydroxide (with an average particle size of 60 µm, commercially available from Nippon Light Metal Co., Ltd.), 5 g (5 mass % in terms of oxide of $MoO_3$) of molybdenum trioxide (commercially available from Taiyo Koko Co., Ltd.), and 0.95 g (0.9 mass % in terms of oxide of $SiO_2$) of silicon dioxide (special grade, commercially available from Kanto Chemical Co., Inc.) were mixed in a mortar to obtain a mixture. The obtained mixture was put into a crucible and fired in a ceramic electric furnace at a temperature raising rate of 5° C./min, a holding temperature of 1,100° C., and a holding time of 10 hours. The temperature was lowered to room temperature at a cooling rate of 5° C./min and the crucible was then removed, and thereby 105.0 g of a light blue powder was obtained. The obtained powder was ground in a mortar until it passed through a 106 µm sieve.

Subsequently, 100 g of the obtained light blue powder was dispersed in 150 mL of 0.5% ammonia water, the dispersion solution was stirred at room temperature (25 to 30° C.) for 0.5 hours, ammonia water was then removed by filtration, washing with water and drying were performed to remove molybdenum remaining on the surface of the particles, and thereby 98 g of a powder was obtained. Then, fine particle components were classified and removed using an airflow classifier utilizing the Coanda effect (HIPREC classifier HPC-ZERO type, commercially available from Powder Systems Co., Ltd.), and thereby 65 g of an alumina particle powder was obtained. In addition, when the zeta potential was measured, it was found that the isoelectric point of the obtained alumina particles was pH 5.3.

According to SEM observation, it was confirmed that the obtained powder was formed of three or more plate-like alumina particles and the alumina particles had a card-house structure in which the plate-like alumina particles were fixed to each other (FIG. 3). When the average particle size of the obtained powder was measured, this was 55 µm. In addition, it was confirmed that the plate-like alumina themselves constituting a card-house structure had a polygonal plate shape, a thickness D of 0.4 µm, a major diameter L of 9 µm, and an aspect ratio of 23. In addition, when XRD measurement was performed, a sharp scattering peak derived from α-alumina appeared, and no alumina crystal peak other than the a crystal structure was observed. In addition, based on X-ray fluorescence quantitative analysis (XRF) results, the obtained particles contained 0.79 mass % of molybdenum in terms of molybdenum trioxide, and the concentration of Si with respect to Al [Si]/[Al](molar ratio) was 0.74%.

Next, 5 g of card-house type alumina particles was dispersed in 45 mL of water to obtain a dispersion solution. The pH of the dispersion solution was adjusted to 1.8 using 1 Mol HCl, and at the same time, the temperature of the dispersion solution was adjusted to 70° C. While stirring the dispersion solution, 23 g of a 1.5% $TiCl_4$ aqueous solution was added dropwise within 8 hours (theoretical coating rate of 11.1%). At the same time, the pH of the dispersion solution was maintained at 1.8 using 39 g of a 2% NaOH aqueous solution. After the $TiCl_4$ aqueous solution was added dropwise, the dispersion solution was additionally stirred for 4 hours, and the dispersion solution was filtered and washed with water. After drying at 110° C. for 10 hours, 5.32 g of a powder was obtained.

5.32 g of the powder was fired at 800° C. for 2 hours. Thereby, 5.30 g of a sample of card-house type composite particles coated with titanium oxide was obtained. The BET specific surface area value of the obtained card-house type composite particles was 1.3 m²/g.

Example 2

5.30 g of a sample of a card-house type composite particles coated with titanium oxide was obtained in the same manner as in Example 1 except that a time for which a $TiCl_4$ aqueous solution was added dropwise was changed to be within 16 hours. The BET specific surface area value of the obtained card-house type composite particles was 2.5 m²/g.

Example 3

7.5 g of the card-house type alumina particles obtained in Example 1 were dispersed in 75 mL of water to obtain a dispersion solution. The pH of the dispersion solution was adjusted to 2.7 using 1 Mol HCl, and at the same time, the temperature of the dispersion solution was adjusted to 75° C. While stirring the dispersion solution, a 8.1% $FeCl_3$ aqueous solution was added dropwise at a rate of 0.17 g/min within 2 hours (theoretical coating rate of 11.1%). At the same time, the pH of the dispersion solution was maintained at 2.7 using 20 g of a 5% NaOH aqueous solution. After the $FeCl_3$ aqueous solution was added dropwise, the dispersion solution was additionally stirred for 4 hours, and the dispersion solution was filtered and washed with water. After drying at 110° C. for 10 hours, 8.25 g of a powder was obtained. 5 g of the powder was fired at 800° C. for 2 hours. Thereby, 4.9 g of a sample of card-house type composite particles coated with iron oxide(III) was obtained. The BET specific surface area value of the obtained card-house type composite particles was 0.7 m²/g. In addition, the color of these composite particles was reddish brown.

Example 4

4.9 g of a sample of card-house type composite particles coated with iron oxide(III) was obtained in the same manner as in Example 3 except that a time for which an $FeCl_3$ aqueous solution was added dropwise was changed to be within 4 hours. The BET specific surface area value of the obtained card-house type composite particles was 1.2 m²/g. In addition, the color of these composite particles was reddish brown.

Example 5

4.9 g of a sample of card-house type composite particles coated with iron oxide(III) was obtained in the same manner as in Example 3 except that a time for which an $FeCl_3$ aqueous solution was added dropwise was changed to be within 7 hours. The BET specific surface area value of the obtained card-house type composite particles was 1.5 m²/g. In addition, the color of these composite particles was reddish brown.

Example 6

4.9 g of a sample of card-house type composite particles coated with iron oxide(III) was obtained in the same manner as in Example 3 except that a time for which an $FeCl_3$ aqueous solution was added dropwise was changed to be within 11 hours. The BET specific surface area value of the obtained card-house type composite particles was 1.9 m²/g. In addition, the color of these composite particles was reddish brown.

Example 7

Card-house type alumina particles were obtained in the same manner as in Example 1 except that germanium dioxide was used in place of silicon dioxide, and 154.5 g (94.4 mass % in terms of oxide of $Al_2O_3$) of aluminum hydroxide (with an average particle size of 60 m, commercially available from Nippon Light Metal Co., Ltd.), 5 g (4.7 mass % in terms of oxide of $MoO_3$) of molybdenum trioxide (commercially available from Taiyo Koko Co., Ltd.), and 1 g (0.9 mass % in terms of oxide of $GeO_2$) of germanium dioxide (commercially available from Mitsubishi Materials Electronic Chemicals Co., Ltd.) were mixed in a mortar to obtain a mixture. In addition, 5.30 g of a sample of card-house type composite particles coated with titanium oxide was obtained in the same manner as in Example 1 except that the temperature of the dispersion solution was set to 75° C. in a coating condition. The BET specific surface area value of the obtained card-house type composite particles was 1.5 m²/g.

Comparative Example 1

Plate-like alumina particles serving as a substrate of composite particles were produced under the same conditions as in Example 1 in Japanese Unexamined Patent Application, First Publication No. 2016-222501. 5 g (65.8 mass % in terms of oxide of $Al_2O_3$) of activated alumina (with an average particle size of 45 m, commercially available from Wako Pure Chemical Industries, Ltd.), 2.5 g (32.9 mass % in terms of oxide of $MoO_3$) of molybdenum trioxide (commercially available from Wako Pure Chemical Industries, Ltd.), and 0.1 g (1.3 mass % in terms of oxide of $SiO_2$) of silica nanoparticles (with an average particle size of 0.1 m to 0.2 μm, KE-P10, commercially available from Nippon Shokubai Co., Ltd.) were mixed in a mortar to obtain 7.6 g of a mixture. The obtained mixture was put into a crucible and fired in a ceramic electric furnace at a temperature raising rate of 5° C./min, a holding temperature of 1,100° C., and a holding time of 10 hours. The temperature was lowered to room temperature at a cooling rate of 5° C./min and the crucible was then removed, and thereby 7.3 g of a blue powder was obtained. The obtained powder was ground in a mortar until it passed through a 106 μm sieve.

Subsequently, 5.0 g of the obtained light blue powder was dispersed in 150 mL of 0.5% ammonia water, the dispersion solution was stirred at room temperature (25 to 30° C.) for 0.5 hours, ammonia water was then removed by filtration, washing with water and drying were performed to remove molybdenum remaining on the surface of the particles, and thereby 4.2 g of a blue powder was obtained.

According to SEM observation, it was confirmed that the obtained powder had a polygonal shape, a thickness of 0.5 m, an average particle size of 10 m, and an aspect ratio of 20. In addition, according to SEM observation, it was confirmed that no aggregate in which twin or more plates overlapped was observed, and the particles had a plate shape having dispersibility. In addition, when XRD measurement was performed, a sharp scattering peak derived from α-alumina appeared, and no alumina crystal peak other than the a crystal structure was observed. In addition, based on X-ray fluorescence quantitative analysis results, the obtained particles contained 0.9 mass % of molybdenum in terms of molybdenum trioxide, and the concentration of Si with respect to Al, [Si]/[Al](molar ratio), was 0.09.

Thus, 5.30 g of a sample of plate-like alumina particles coated with titanium oxide was obtained in the same manner as in Example 1 except that a plate-like alumina was used.

Comparative Example 2

4.9 g of a sample of plate-like alumina particles coated with iron oxide(III) was obtained in the same manner as in Example 3 except that the same plate-like alumina particles as in Comparative Example 1 was used. The color of these composite particles was reddish brown.

TABLE 1

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Amount in terms of oxide added (mass %) | $Al_2O_3$ |  |  | 94.1 |  |  |  | 94.4 | 65.8 |  |
|  | $MoO_3$ |  |  | 5 |  |  |  | 4.7 | 32.9 |  |
|  | $SiO_2$ |  |  | 0.9 |  |  |  | — | 1.3 |  |
|  | $GeO_2$ |  |  | — |  |  |  | 0.9 | — |  |

TABLE 1-continued

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Plate-like alumina constituting card-house type alumina particle | Major diameter L (μm) | | | 9 | | | | 9 | — | — |
| | Thickness D (μm) | | | 0.4 | | | | 0.4 | — | — |
| | Aspect ratio (L/D) | | | 23 | | | | 23 | — | — |
| Card-house type alumina particles | Average particle size (μm)(=$D_{50}$) | | | 55 | | | | 55 | — | — |
| Coating conditions | Inorganic coating layer | $TiO_2$ | $TiO_2$ | $Fe_2O_3$ | $Fe_2O_3$ | $Fe_2O_3$ | $Fe_2O_3$ | $TiO_2$ | $TiO_2$ | $Fe_2O_3$ |
| | Time for which $TiCl_4$ solution is added dropwise (h) | 8 | 16 | — | — | — | — | 8 | 8 | — |
| | Time for which $FeCl_3$ solution is added dropwise (h) | — | — | 2 | 4 | 7 | 11 | — | — | 2 |
| | Temperature (° C.) | 70 | 70 | 75 | 75 | 75 | 75 | 75 | 70 | 75 |
| | pH | 1.8 | 1.8 | 2.7 | 2.7 | 2.7 | 2.7 | 1.8 | 1.8 | 2.7 |
| Composite particles | XRF coating rate (%) | 10.5 | 24.2 | 2.9 | 5.3 | 12.3 | 17.7 | 10.2 | 7.0 | 8.0 |
| | Angle of repose (°) | 35 | 37 | 35 | 37 | 37 | 38 | 35 | 58 | 57 |
| | Evaluation | Good | Good | Good | Good | Good | Good | Good | Poor | Poor |

<<Evaluation>>

The samples of the powders of composites particles of Examples 1 to 7, and Comparative Examples 1 to 2, as well as the samples of the powders of the card-house type alumina particles obtained in Examples 1 to 7, and the powder of plate-like alumina particles used in Comparative Examples 1 to 2, were subjected to the following evaluations. The measurement methods are as follows.

[Shape Analysis of Composite Particles Under a Scanning Electron Microscope]

The produced sample was fixed to a sample support using a double-sided tape and observed using a surface observation device (VE-9800, commercially available from Keyence Corporation), and it was checked whether the composite particles had a card-house structure.

[Composition Analysis of Card-House Type Alumina Particles Through X-Ray Fluorescence (XRF)]

About of 100 mg of the produced sample was placed on a filter paper and covered with a PP film, and an X-ray fluorescence (XRF) analyzing device (Primus IV, commercially available from Rigaku Corporation) was used for analysis.

[Si]/[Al](molar ratio) obtained from XRF analysis results was determined as an amount of Si in the alumina particles.

[Mo]/[Al](molar ratio) obtained from XRF analysis results was determined as an amount of Mo in the alumina particles.

[Measurement of Major Diameter L of Plate-Like Alumina]

The major diameter L of the plate-like alumina was calculated as an arithmetic average value of maximum lengths among distances between two points on the outline of the plate for any 100 plate-like aluminas located in the center part of the alumina particles.

[Measurement of Thickness D of Plate-Like Alumina]

An average value obtained by measuring thicknesses at 50 locations using a scanning electron microscope (SEM) was determined as a thickness D (μm) of the plate-like alumina.

[Aspect Ratio L/D of Plate-Like Alumina]

The aspect ratio of the plate-like alumina was determined using the following formula.

Aspect Ratio=Major Diameter $L$ of Plate-like Alumina/Thickness $D$ of Plate-like Alumina.

[Measurement of Average Particle Size According to Measurement of Particle Size Distribution]

The produced sample was analyzed using the laser diffraction type dry particle size distribution analyzer (HELOS (H3355)&RODOS, commercially available from Japan Laser Corp.) under conditions of a dispersion pressure of 0.3 MPa and a tension of 90 hPa, and $D_{50}$ (μm) was obtained from the volume-based cumulative particle size distribution, and determined as an average particle size of card-house type alumina particles.

[XRF Coating Rate of Composite Particles]

About 70 mg of the produced sample was place on a filter paper and covered with a PP film, and composition analysis was performed using an X-ray fluorescence (XRF) analyzing device (Primus IV, commercially available from Rigaku Corporation).

The XRF coating rate (%) of composite particles was determined from $[TiO_2]/[Al_2O_3]$ or $[Fe_2O_3]/[Al_2O_3]$(mass ratio) obtained from XRF analysis results.

[Measurement of Fluidity of Powder]

300 g of a sample was prepared, and the angle of repose of the sample was measured by the method according to JIS R9301-2-2, and the fluidity of the powder was evaluated. The value was a value obtained by rounding off the second decimal place to the first decimal place. When the angle of repose was 50.0° or less, the fluidity was evaluated as "good", and when the angle of repose exceeded 50.0°, the fluidity was evaluated as "poor". The evaluation results are shown in Table 1.

In the powder obtained in Example 1, it was confirmed that an inorganic coating part was formed on the surface of plate-like alumina constituting the alumina particles having a card-house structure in which three or more pieces of plate-like alumina were fixed to each other (FIG. 4). In addition, also in the powders obtained in Examples 2 to 7, it was confirmed that an inorganic coating part was formed on the surface of the plate-like alumina as in Example 1.

In addition, it was confirmed that plate-like alumina constituting the card-house type alumina particles of the examples had values of the major diameter $L(D_{50})$, the thickness D, and the aspect ratio described in Table 1.

On the other hand, in the powders obtained in Comparative Examples 1 and 2, it was confirmed that no aggregate in which twin or more plates overlapped was observed and the composite particles had a plate shape.

In addition, according to SEM observation of Examples 1, 2 and 7 and Comparative Example 1, it was confirmed that the surface of the plate-like alumina was coated with particulate titanium oxide ($TiO_2$). Similarly, according to SEM observation of Examples 3 to 6 and Comparative Example 2, it was confirmed that the surface of the plate-like alumina was coated with particulate iron oxide(III) ($Fe_2O_3$).

In addition, in the card-house type composite particles of Example 1, when a time for which a $TiCl_4$ solution was added dropwise was 8 hours and an inorganic coating part was formed of titanium oxide, the XRF coating rate was 10.5%. It was found that the angle of repose in this case was 35°, and favorable fluidity was obtained.

In the card-house type composite particles of Example 2, when a time for which a $TiCl_4$ solution was added dropwise was 16 hours and an inorganic coating part was formed of titanium oxide, the XRF coating rate was 24.2%. It was found that the angle of repose in this case was 37°, and favorable fluidity was obtained.

In the card-house type composite particles of Example 3, when a time for which a $FeCl_3$ solution was added dropwise was 2 hours and an inorganic coating part was formed of iron oxide(III), the XRF coating rate was 2.9%. It was confirmed that the angle of repose in this case was 350 and favorable fluidity was obtained.

In the card-house type composite particles of Examples 4 to 6, when times for which a $FeCl_3$ solution was added dropwise were 4 hours, 7 hours, and 11 hours, and an inorganic coating part was formed of iron oxide(III), the XRF coating rate was 5.3%, 12.3%, and 17.7%, respectively. It was found that the angle of repose in this case was 37°, 37°, or 38°, and favorable fluidity was obtained. In addition, it was found that, when a time for which a $FeCl_3$ solution was added dropwise increased, the XRF coating rate increased while maintaining a favorable angle of repose.

In the card-house type composite particles of Example 7, when germanium dioxide was used as a shape-controlling agent, the XRF coating rate was 10.2%. It was found that the angle of repose in this case was 350 and favorable fluidity was obtained.

In addition, it was confirmed that Examples 3 to 6 coated with iron oxide(III) exhibited reddish brown.

On the other hand, in the composite particles of Comparative Example 1, when plate-like alumina having a $D_{50}$ value of 10 m, a thickness D of 0.5 µm, and an aspect ratio of 20 was used, a time for which a $TiCl_4$ solution was added dropwise was 8 hours, and an inorganic coating part was formed of titanium oxide, the XRF coating rate was 7.0%. It was confirmed that the angle of repose in this case was 580 and was larger than the values of the angles of repose of Examples 1 to 6 and the fluidity was poor.

In the composite particles of Comparative Example 2, when a time for which a $FeCl_3$ solution was added dropwise was 2 hours and an inorganic coating part was formed of iron oxide(III), the XRF coating rate was 8.0%. It was found that the angle of repose in this case was 57°, and as in Comparative Example 1, was larger than the values of the angles of repose of Examples 1 to 6 and the fluidity was poor.

INDUSTRIAL APPLICABILITY

Since the composite particles of the present invention have excellent fluidity, they can be appropriately used for thermally conductive fillers, cosmetics, polishing materials, high-brilliance pigments, lubricants, conductive powder substrates, ceramic materials, and the like so that excellent dispersibility and high filling properties can be expected.

The invention claimed is:
1. A composite particle comprising:
   an alumina particle having a card-house structure which is formed of three or more pieces of plate-like alumina and in which the pieces of plate-like alumina are fixed to each other; and
   an inorganic coating part provided on a surface of the plate-like alumina,
   and wherein the average particle size of the alumina particle is 3 µm or more and 1,000 µm or less,
   wherein the alumina particle further comprise at least one of silicon and germanium, and wherein
   a content of silicon with respect to 100% by mass of the alumina particles, which is obtained by XRF analysis, is 0.5% by weight to 4% by weight in terms of silicon dioxide ($SiO_2$);
   and a content of germanium with respect to 100% by weight of the alumina particles is 0.01% by weight to 8% by weight in terms of germanium dioxide ($GeO_2$).
2. The composite particle according to claim 1, wherein the inorganic coating part is made of an oxide.
3. The composite particle according to claim 2, wherein the oxide includes one or more selected from the group consisting of titanium oxide, iron oxide, and silica.
4. The composite particle according to claim 1, wherein the inorganic coating part is made of a metal.
5. The composite particle according to claim 4, wherein the includes one or more selected from the group consisting of silver, nickel, copper, gold, and platinum.
6. The composite particle according to claim 1, wherein the alumina particle comprises mullite in a surface layer.

* * * * *